(12) United States Patent
Jung et al.

(10) Patent No.: US 9,584,651 B2
(45) Date of Patent: Feb. 28, 2017

(54) MOBILE TERMINAL AND METHOD FOR CONTROLLING THE SAME

(71) Applicant: LG ELECTRONICS INC., Seoul (KR)

(72) Inventors: Sehyun Jung, Seoul (KR); Eunsoo Jung, Seoul (KR); Songyi Baek, Seoul (KR); Kyunghye Seo, Seoul (KR)

(73) Assignee: LG Electronics Inc., Seoul (KR)

( * ) Notice: Subject to any disclaimer, the term of this patent is extended or adjusted under 35 U.S.C. 154(b) by 43 days.

(21) Appl. No.: 14/280,484

(22) Filed: May 16, 2014

(65) Prior Publication Data
US 2015/0156312 A1  Jun. 4, 2015

(30) Foreign Application Priority Data

Dec. 3, 2013 (KR) .......................... 10-2013-0148921

(51) Int. Cl.
*H04M 1/00* (2006.01)
*H04M 1/725* (2006.01)
*G06F 1/16* (2006.01)
*H04M 1/02* (2006.01)

(52) U.S. Cl.
CPC ...... *H04M 1/72575* (2013.01); *G06F 1/1677* (2013.01); *H04M 1/72527* (2013.01); *H04M 1/0245* (2013.01); *H04M 2250/22* (2013.01)

(58) Field of Classification Search
CPC ......... H04M 1/72519; H04M 1/72583; H04M 1/72522; H04M 1/72547; H04M 1/0214; H04M 1/23; H04M 1/3833; H04M 1/0247; H04M 1/0237
USPC .......................... 455/550.1, 566, 575.1, 90.3
See application file for complete search history.

(56) References Cited

U.S. PATENT DOCUMENTS

| | | | | |
|---|---|---|---|---|
| 6,535,749 B1 * | 3/2003 | Iwata | .................. | H04M 1/0214 455/556.2 |
| 2001/0023194 A1 * | 9/2001 | Pettersson | ........... | H04M 1/0214 455/566 |
| 2005/0020327 A1 * | 1/2005 | Chung | ................ | H04M 1/0216 455/575.3 |
| 2012/0081319 A1 * | 4/2012 | Gimpl | .................. | G06F 1/1616 345/173 |
| 2012/0276958 A1 * | 11/2012 | Inami | .................. | H04M 1/0237 455/566 |

* cited by examiner

*Primary Examiner* — Nhan Le
(74) *Attorney, Agent, or Firm* — KED & Associates LLP

(57) ABSTRACT

A mobile terminal and a method of controlling therefore are disclosed. The mobile terminal according to one embodiment of the present invention includes a housing, a display, a sensing unit configured to sense whether a cover is opened on the display in a state that the cover where an opening part is formed to make at least a part of the display to be exposed is installed in the housing, and a controller. If closing of the cover is detected in the middle of executing the first application, the controller controls the display to change a display state of an execution screen of the first application to make the display state of the execution screen of the first application correspond to a position and a size of the opening part of the cover.

20 Claims, 35 Drawing Sheets

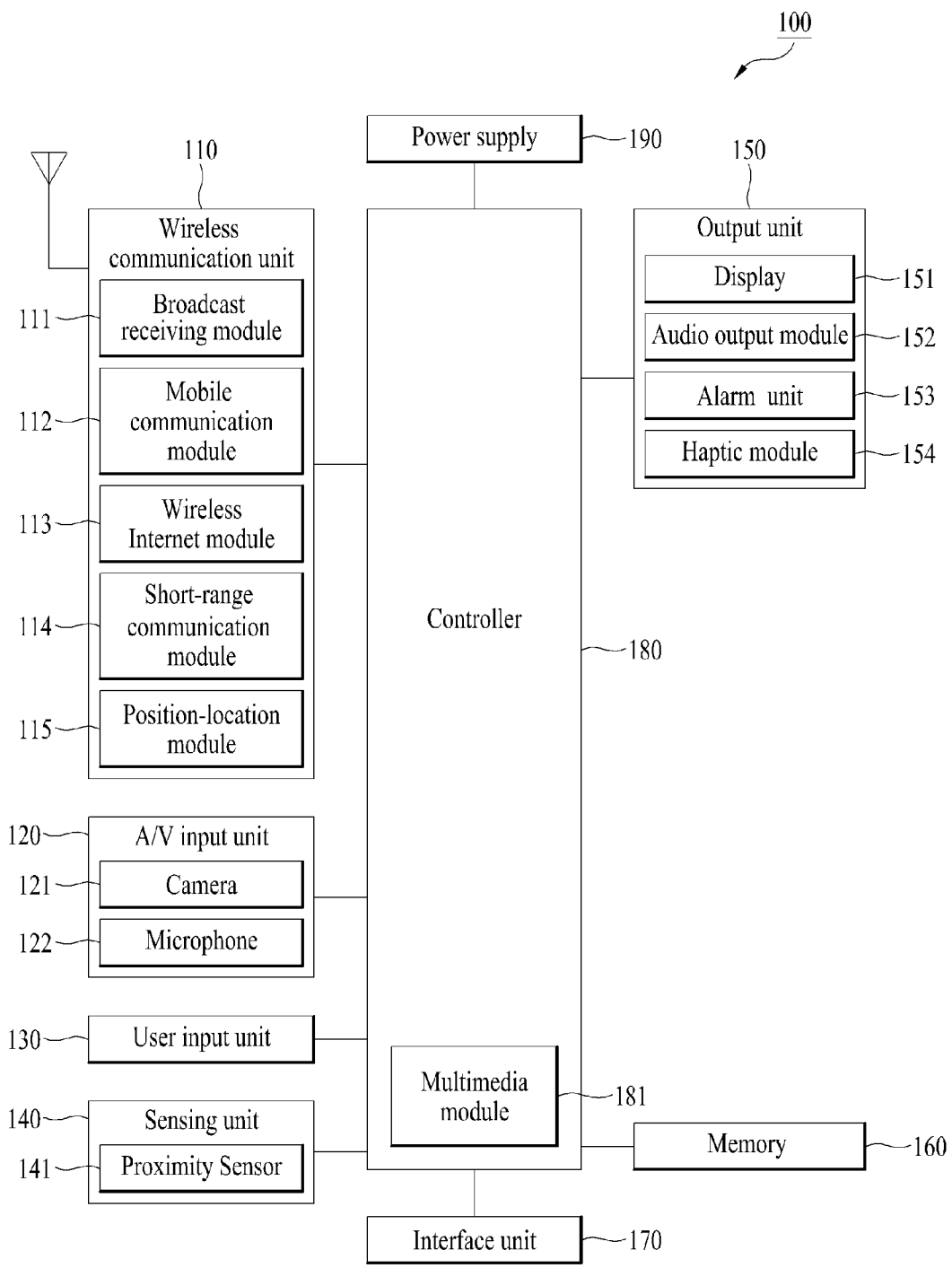

(a)  (b)

(a)  (b)

(a)  (b)

FIG. 28
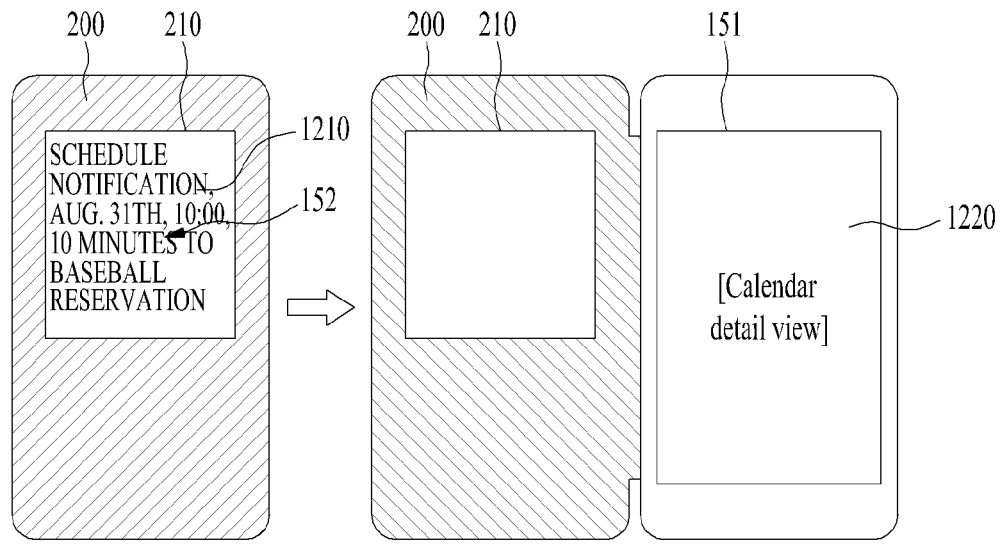
(a)
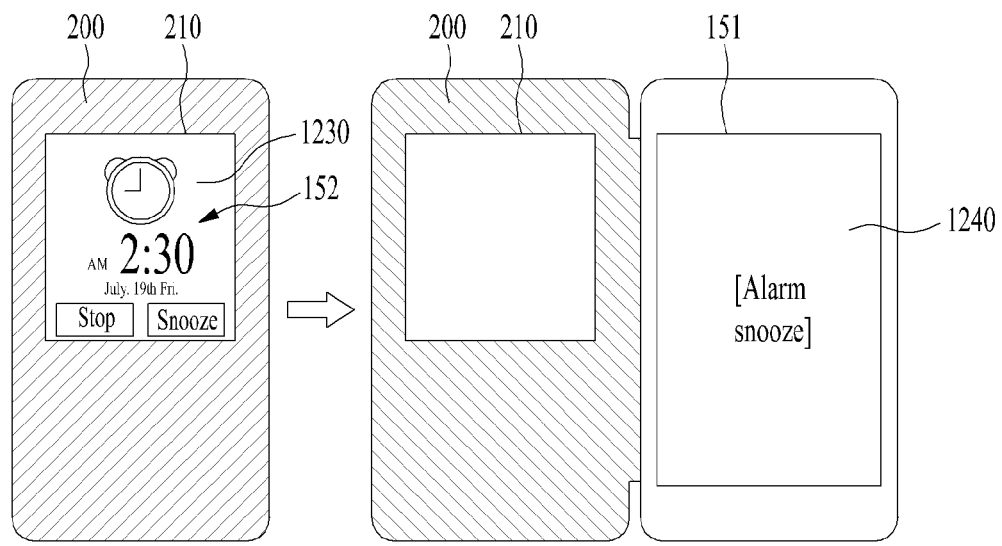
(b)

(a)                    (b)

MOBILE TERMINAL AND METHOD FOR CONTROLLING THE SAME

Pursuant to 35 U.S.C. §119(a), this application claims the benefit of earlier filing date and right of priority to Korean Application No. 10-2013-0148921, filed on Dec. 3, 2013, the contents of which are hereby incorporated by reference herein in their entirety.

BACKGROUND OF THE INVENTION

Field of the Invention

The present invention relates to a mobile terminal and an apparatus therefor enabling a user to more conveniently use the mobile terminal.

Discussion of the Related Art

A mobile terminal is a device which may be configured to perform various functions. Examples of such functions include data and voice communications, capturing images and video via a camera, recording audio, playing music files and outputting music via a speaker system, and displaying images and video on a display. Some terminals include additional functionality which supports game playing, while other terminals are also configured as multimedia players. More recently, mobile terminals have been configured to receive broadcast and multicast signals which permit viewing of contents, such as videos and television programs.

Generally, terminals can be classified into mobile terminals and stationary terminals according to a presence or non-presence of mobility. And, the mobile terminals can be further classified into handheld terminals and vehicle mount terminals according to availability for hand-carry.

There are ongoing efforts to support and increase the functionality of mobile terminals. Such efforts include software and hardware improvements, as well as changes and improvements in the structural components which form the mobile terminal.

Recently, more users use a mobile terminal in a state that a cover designed to protect a display is installed in a housing of the mobile terminal. In general, the cover is equipped with an opening part to expose a part of the display in order for a user to use some functions of the mobile terminal even in a state that the cover is closed. Yet, the functions of the mobile terminal capable of being used through the opening part are very limited in the state that the cover is closed. Moreover, when a user open and close the cover, functional continuity of the mobile terminal is not currently provided.

SUMMARY OF THE INVENTION

Accordingly, the present invention is directed to an apparatus and method thereof that substantially obviate one or more problems due to limitations and disadvantages of the related art.

One technical task that one embodiment of the present invention intends to achieve is to provide a mobile terminal enabling a user to use various functions using a display which is exposed by an opening part installed in a cover in a state that the cover is closed.

Another technical task that one embodiment of the present invention intends to achieve is to provide a mobile terminal capable of providing continuity of a function currently executing when a user open and close a cover.

Technical tasks obtainable from the present invention are non-limited the above-mentioned technical task. And, other unmentioned technical tasks can be clearly understood from the following description by those having ordinary skill in the technical field to which the present invention pertains.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, according to one embodiment of the present invention, a mobile terminal includes a housing, a display, a sensing unit configured to sense whether a cover is opened on the display in a state that the cover where an opening part is formed to make at least a part of the display to be exposed is installed in the housing, and a controller. If closing of the cover is detected in the middle of executing the first application, the controller can control the display to change a display state of an execution screen of the first application to make the display state of the execution screen of the first application correspond to a position and a size of the opening part of the cover.

In another aspect of the present invention, according to one embodiment of the present invention, a method of controlling a mobile terminal includes the steps of sensing the closing of the cover, entering a prescribed mode of a multitasking mode, a camera mode, a memo mode, or a message mode according to a command input of a user or occurrence of an external event, and displaying an execution screen corresponding to the entered mode in a specific area of a screen of the display corresponding to the opening part of the cover to make the execution screen correspond to a position and a size of the opening part of the cover.

It is to be understood that both the foregoing general description and the following detailed description of the present invention are exemplary and explanatory and are intended to provide further explanation of the invention as claimed.

BRIEF DESCRIPTION OF THE DRAWINGS

The above and other aspects, features, and advantages of the present invention will become more apparent upon consideration of the following description of preferred embodiments, taken in conjunction with the accompanying drawing figures.

FIG. 1 is a block diagram of a mobile terminal in accordance with an embodiment of the present invention;

FIG. 13 is a diagram for explaining an example of an event occurred in a closed state of a cover in a mobile terminal according to one embodiment of the present invention; an external event may include receiving a call signal in absence, receiving a text message, receiving a message via a messenger application, receiving promotion information of a shopping application and the like;

FIG. 28 is a diagram for explaining an example of a screen displayed in a display in case that a cover changes from a closed state to an opened state after an event occurs in the closed state of the cover in a mobile terminal according to one embodiment of the present invention;

DETAILED DESCRIPTION OF THE PREFERRED EMBODIMENTS

Figure 2A:
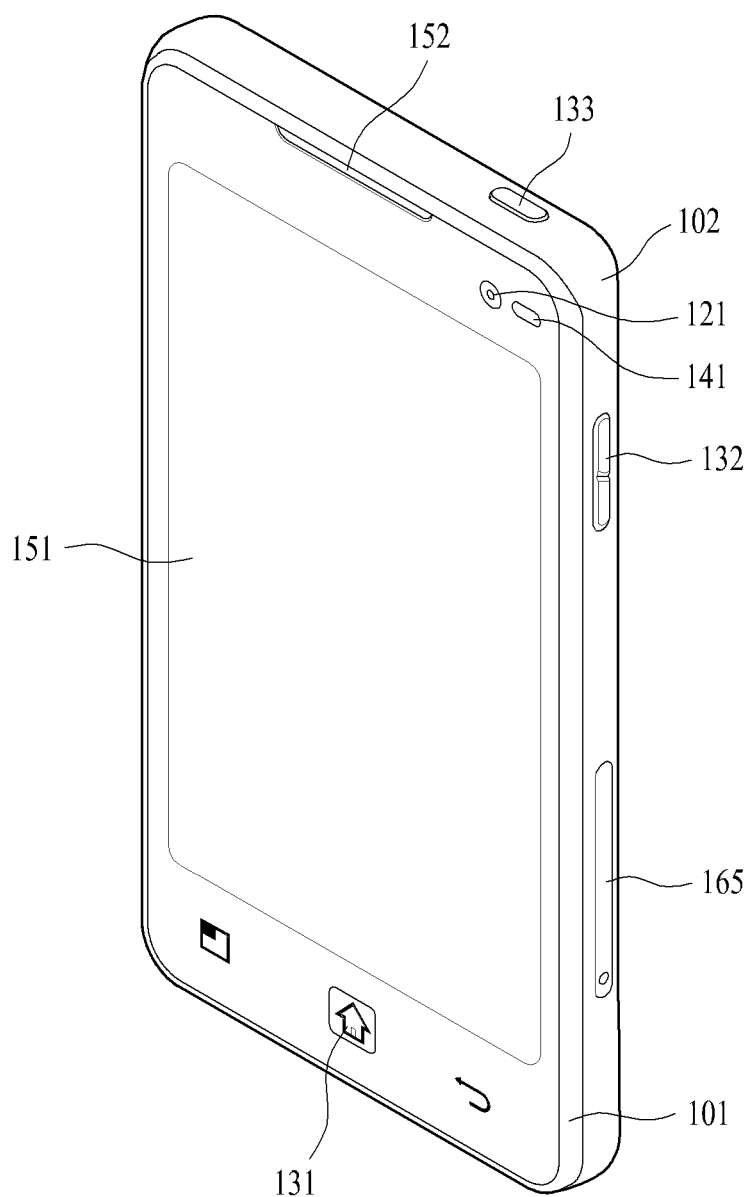
FIG. 2A is a front perspective diagram of a mobile terminal according to one embodiment of the present invention.

In the following detailed description, reference is made to the accompanying drawing figures which form a part hereof, and which show by way of illustration specific embodiments of the invention. It is to be understood by those of ordinary skill in this technological field that other embodiments may be utilized, and structural, electrical, as well as procedural changes may be made without departing from the scope of the present invention. Wherever possible, the same reference numbers will be used throughout the drawings to refer to the same or similar parts.

As used herein, the suffixes 'module', 'unit' and 'part' are used for elements in order to facilitate the disclosure only. Therefore, significant meanings or roles are not given to the suffixes themselves and it is understood that the 'module', 'unit' and 'part' can be used together or interchangeably.

The present invention can be applicable to a various types of terminals. Examples of such terminals include mobile terminals, such as mobile phones, user equipment, smart phones, mobile computers, digital broadcast terminals, personal digital assistants, portable multimedia players (PMP) and navigators.

FIG. 1 is a block diagram of a mobile terminal 100 in accordance with an embodiment of the present invention. FIG. 1 shows the mobile terminal 100 according to one embodiment of the present invention includes a wireless communication unit 110, an A/V (audio/video) input unit 120, a user input unit 130, a sensing unit 140, an output unit 150, a memory 160, an interface unit 170, a controller 180, a power supply unit 190 and the like. FIG. 1 shows the mobile terminal 100 having various components, but it is understood that implementing all of the illustrated components is not a requirement. Greater or fewer components may alternatively be implemented.

In the following description, the above elements of the mobile terminal 100 are explained in sequence.

First of all, the wireless communication unit 110 typically includes one or more components which permits wireless communication between the mobile terminal 100 and a wireless communication system or network within which the mobile terminal 100 is located. For instance, the wireless communication unit 110 can include a broadcast receiving module 111, a mobile communication module 112, a wireless internet module 113, a short-range communication module 114, a position-location module 115 and the like.

The broadcast receiving module 111 receives a broadcast signal and/or broadcast associated information from an external broadcast managing server via a broadcast channel.

The broadcast channel may include a satellite channel and a terrestrial channel.

The broadcast managing server generally refers to a server which generates and transmits a broadcast signal and/or broadcast associated information or a server which is provided with a previously generated broadcast signal and/or broadcast associated information and then transmits the provided signal or information to a terminal. The broadcast signal may be implemented as a TV broadcast signal, a radio broadcast signal, and a data broadcast signal, among others. If desired, the broadcast signal may further include a broadcast signal combined with a TV or radio broadcast signal.

At least two broadcast receiving modules 111 can be provided to the mobile terminal 100 in pursuit of simultaneous receptions of at least two broadcast channels or broadcast channel switching facilitation.

The broadcast associated information includes information associated with a broadcast channel, a broadcast program, a broadcast service provider, etc. And, the broadcast associated information can be provided via a mobile communication network. In this case, the broadcast associated information can be received by the mobile communication module 112.

The broadcast associated information can be implemented in various forms. For instance, broadcast associated information may include an electronic program guide (EPG) of digital multimedia broadcasting (DMB) and electronic service guide (ESG) of digital video broadcast-handheld (DVB-H).

The broadcast receiving module 111 may be configured to receive broadcast signals transmitted from various types of broadcast systems. By nonlimiting example, such broadcasting systems include digital multimedia broadcasting-terrestrial (DMB-T), digital multimedia broadcasting-satellite (DMB-S), digital video broadcast-handheld (DVB-H), DVB-CBMS, OMA-BCAST, the data broadcasting system known as media forward link only (MediaFLO®) and integrated services digital broadcast-terrestrial (ISDB-T). Optionally, the broadcast receiving module 111 can be configured suitable for other broadcasting systems as well as the above-explained digital broadcasting systems.

The broadcast signal and/or broadcast associated information received by the broadcast receiving module 111 may be stored in a suitable device, such as a memory 160.

The mobile communication module 112 transmits/receives wireless signals to/from one or more network entities (e.g., base station, external terminal, server, etc.) via a mobile network such as GSM(Gobal System for Mobile communications), CDMA(Code Division Multiple Access), WCDMA(Wideband CDMA) and so on. Such wireless signals may represent audio, video, and data according to text/multimedia message transceivings, among others.

The wireless internet module 113 supports Internet access for the mobile terminal 100. This module may be internally or externally coupled to the mobile terminal 100. In this case, the wireless Internet technology can include WLAN (Wireless LAN) (Wi-Fi), Wibro (Wireless broadband), Wimax (World Interoperability for Microwave Access), HSDPA(High Speed Downlink Packet Access), GSM, CDMA, WCDMA, LTE (Long Term Evolution) etc.

Wireless internet access by Wibro, HSPDA, GSM, CDMA, WCDMA, LTE or the like is achieved via a mobile communication network. In this aspect, the wireless internet module 113 configured to perform the wireless internet access via the mobile communication network can be understood as a sort of the mobile communication module 112.

The short-range communication module 114 facilitates relatively short-range communications. Suitable technologies for implementing this module include radio frequency identification (RFID), infrared data association (IrDA), ultra-wideband (UWB), as well at the networking technologies commonly referred to as Bluetooth and ZigBee, to name a few.

The position-location module 115 identifies or otherwise obtains the location of the mobile terminal 100. If desired, this module may be implemented with a global positioning system (GPS) module.

According to the current technology, the GPS module 115 is able to precisely calculate current 3-dimensional position information based on at least one of longitude, latitude and altitude and direction (or orientation) by calculating distance information and precise time information from at least three satellites and then applying triangulation to the calculated information. Currently, location and time informations are calculated using three satellites, and errors of the calculated location position and time informations are then amended using another satellite. Besides, the GPS module 115 is able to calculate speed information by continuously calculating a real-time current location.

Referring to FIG. 1, the audio/video (A/V) input unit 120 is configured to provide audio or video signal input to the mobile terminal 100. As shown, the A/V input unit 120 includes a camera 121 and a microphone 122. The camera 121 receives and processes image frames of still pictures or video, which are obtained by an image sensor in a video call mode or a photographing mode. And, the processed image frames can be displayed on the display 151.

The image frames processed by the camera 121 can be stored in the memory 160 or can be externally transmitted via the wireless communication unit 110. Optionally, at least two cameras 121 can be provided to the mobile terminal 100 according to environment of usage.

The microphone 122 receives an external audio signal while the portable device is in a particular mode, such as phone call mode, recording mode and voice recognition. This audio signal is processed and converted into electric audio data. The processed audio data is transformed into a format transmittable to a mobile communication base station via the mobile communication module 112 in case of a call mode. The microphone 122 typically includes assorted noise removing algorithms to remove noise generated in the course of receiving the external audio signal.

The user input unit 130 generates input data responsive to user manipulation of an associated input device or devices. Examples of such devices include a keypad, a dome switch, a touchpad (e.g., static pressure/capacitance), a jog wheel, a jog switch, etc.

The sensing unit 140 provides sensing signals for controlling operations of the mobile terminal 100 using status measurements of various aspects of the mobile terminal. For instance, the sensing unit 140 may detect an open/close status of the mobile terminal 100, relative positioning of components (e.g., a display and keypad) of the mobile terminal 100, a change of position of the mobile terminal 100 or a component of the mobile terminal 100, a presence or absence of user contact with the mobile terminal 100, orientation or acceleration/deceleration of the mobile terminal 100, and free-falling of the mobile terminal 100. As an example, consider the mobile terminal 100 being configured as a slide-type mobile terminal. In this configuration, the sensing unit 140 may sense whether a sliding portion of the mobile terminal is open or closed. Other examples include the sensing unit 140 sensing the presence or absence of power provided by the power supply 190, the presence or absence of a coupling or other connection between the interface unit 170 and an external device. And, the sensing unit 140 can include a proximity sensor 141.

The output unit 150 generates outputs relevant to the senses of sight, hearing, touch and the like. And, the output unit 150 includes the display 151, an audio output module 152, an alarm unit 153, a haptic module 154, a projector module 155 and the like.

The display 151 is typically implemented to visually display (output) information associated with the mobile terminal 100. For instance, if the mobile terminal is operating in a phone call mode, the display will generally provide a user interface (UI) or graphical user interface (GUI) which includes information associated with placing, conducting, and terminating a phone call. As another example, if the mobile terminal 100 is in a video call mode or a photographing mode, the display 151 may additionally or alternatively display images which are associated with these modes, the UI or the GUI.

The display module 151 may be implemented using known display technologies including, for example, a liquid crystal display (LCD), a thin film transistor-liquid crystal display (TFT-LCD), an organic light-emitting diode display (OLED), a flexible display and a three-dimensional display. The mobile terminal 100 may include one or more of such displays.

Some of the above displays can be implemented in a transparent or optical transmittive type, which can be named a transparent display. As a representative example for the transparent display, there is TOLED (transparent OLED) or the like. A rear configuration of the display 151 can be implemented in the optical transmittive type as well. In this configuration, a user is able to see an object in rear of a terminal body via the area occupied by the display 151 of the terminal body.

At least two displays 151 can be provided to the mobile terminal 100 in accordance with the implemented configuration of the mobile terminal 100. For instance, a plurality of displays can be arranged on a single face of the mobile terminal 100 in a manner of being spaced apart from each other or being built in one body. Alternatively, a plurality of displays can be arranged on different faces of the mobile terminal 100.

In case that the display 151 and a sensor for detecting a touch action (hereinafter called 'touch sensor') configures a mutual layer structure (hereinafter called 'touchscreen'), it is able to use the display 151 as an input device as well as an output device. In this case, the touch sensor can be configured as a touch film, a touch sheet, a touchpad or the like.

The touch sensor can be configured to convert a pressure applied to a specific portion of the display 151 or a variation of a capacitance generated from a specific portion of the display 151 to an electric input signal. Moreover, it is able to configure the touch sensor to detect a pressure of a touch as well as a touched position or size.

If a touch input is made to the touch sensor, signal(s) corresponding to the touch is transferred to a touch controller. The touch controller processes the signal(s) and then transfers the processed signal(s) to the controller 180. Therefore, the controller 180 is able to know whether a prescribed portion of the display 151 is touched.

Referring to FIG. 1, a proximity sensor (141) can be provided to an internal area of the mobile terminal 100 enclosed by the touchscreen or around the touchscreen. The proximity sensor is the sensor that detects a presence or non-presence of an object approaching a prescribed detecting surface or an object existing around the proximity sensor using an electromagnetic field strength or infrared ray without mechanical contact. Hence, the proximity sensor has durability longer than that of a contact type sensor and also has utility wider than that of the contact type sensor.

The proximity sensor can include one of a transmittive photoelectric sensor, a direct reflective photoelectric sensor, a mirror reflective photoelectric sensor, a radio frequency oscillation proximity sensor, an electrostatic capacity proximity sensor, a magnetic proximity sensor, an infrared proximity sensor and the like. In case that the touchscreen includes the electrostatic capacity proximity sensor, it is configured to detect the proximity of a pointer using a variation of electric field according to the proximity of the pointer. In this case, the touchscreen (touch sensor) can be classified as the proximity sensor.

The proximity sensor detects a proximity touch and a proximity touch pattern (e.g., a proximity touch distance, a proximity touch duration, a proximity touch position, a proximity touch shift state, etc.). And, information corresponding to the detected proximity touch action and the detected proximity touch pattern can be outputted to the touchscreen.

The audio output module 152 functions in various modes including a call-receiving mode, a call-placing mode, a recording mode, a voice recognition mode, a broadcast reception mode and the like to output audio data which is received from the wireless communication unit 110 or is stored in the memory 160. During operation, the audio output module 152 outputs audio relating to a particular function (e.g., call received, message received, etc.). The audio output module 152 is often implemented using one or more speakers, buzzers, other audio producing devices, and combinations thereof The alarm unit 153 is output a signal for announcing the occurrence of a particular event associated with the mobile terminal 100. Typical events include a call received event, a message received event and a touch input received event. The alarm unit 153 is able to output a signal for announcing the event occurrence by way of vibration as well as video or audio signal. The video or audio signal can be outputted via the display 151 or the audio output unit 152. Hence, the display 151 or the audio output module 152 can be regarded as a part of the alarm unit 153.

The haptic module 154 generates various tactile effects that can be sensed by a user. Vibration is a representative one of the tactile effects generated by the haptic module 154. Strength and pattern of the vibration generated by the haptic module 154 are controllable. For instance, different vibrations can be outputted in a manner of being synthesized together or can be outputted in sequence.

The haptic module 154 is able to generate various tactile effects as well as the vibration. For instance, the haptic module 154 generates the effect attributed to the arrangement of pins vertically moving against a contact skin surface, the effect attributed to the injection/suction power of air though an injection/suction hole, the effect attributed to the skim over a skin surface, the effect attributed to the contact with electrode, the effect attributed to the electro-static force, the effect attributed to the representation of hold/cold sense using an endothermic or exothermic device and the like.

The haptic module 154 can be implemented to enable a user to sense the tactile effect through a muscle sense of finger, arm or the like as well as to transfer the tactile effect through a direct contact. Optionally, at least two haptic modules 154 can be provided to the mobile terminal 100 in accordance with the corresponding configuration type of the mobile terminal 100.

The projector module 155 is the element for performing an image projector function using the mobile terminal 100. And, the projector module 155 is able to display an image, which is identical to or partially different at least from the image displayed on the display 151, on an external screen or wall according to a control signal of the controller 180.

In particular, the projector module 155 can include a light source (not shown in the drawing) generating light (e.g., laser) for projecting an image externally, an image producing means (not shown in the drawing) for producing an image to output externally using the light generated from the light source, and a lens (not shown in the drawing) for enlarging to output the image externally in a predetermined focus distance. And, the projector module 155 can further include a device (not shown in the drawing) for adjusting an image projected direction by mechanically moving the lens or the whole module.

The projector module 155 can be classified into a CRT (cathode ray tube) module, an LCD (liquid crystal display) module, a DLP (digital light processing) module or the like according to a device type of a display means. In particular, the DLP module is operated by the mechanism of enabling the light generated from the light source to reflect on a DMD (digital micro-mirror device) chip and can be advantageous for the downsizing of the projector module 151.

Preferably, the projector module 155 can be provided in a length direction of a lateral, front or backside direction of the mobile terminal 100. And, it is understood that the projector module 155 can be provided to any portion of the mobile terminal 100 according to the necessity thereof.

The memory unit 160 is generally used to store various types of data to support the processing, control, and storage requirements of the mobile terminal 100. Examples of such data include program instructions for applications operating on the mobile terminal 100, contact data, phonebook data, messages, audio, still pictures (or photo), moving pictures, etc. And, a recent use history or a cumulative use frequency of each data (e.g., use frequency for each phonebook, each message or each multimedia) can be stored in the memory unit 160. Moreover, data for various patterns of vibration and/or sound outputted in case of a touch input to the touchscreen can be stored in the memory unit 160.

The memory 160 may be implemented using any type or combination of suitable volatile and non-volatile memory or storage devices including hard disk, random access memory (RAM), static random access memory (SRAM), electrically erasable programmable read-only memory (EEPROM), erasable programmable read-only memory (EPROM), programmable read-only memory (PROM), read-only memory (ROM), magnetic memory, flash memory, magnetic or optical disk, multimedia card micro type memory, card-type memory (e.g., SD memory, XD memory, etc.), or other similar memory or data storage device. And, the mobile terminal 100 is able to operate in association with a web storage for performing a storage function of the memory 160 on Internet.

The interface unit 170 is often implemented to couple the mobile terminal 100 with external devices. The interface unit 170 receives data from the external devices or is supplied with the power and then transfers the data or power to the respective elements of the mobile terminal 100 or enables data within the mobile terminal 100 to be transferred to the external devices. The interface unit 170 may be configured using a wired/wireless headset port, an external charger port, a wired/wireless data port, a memory card port, a port for coupling to a device having an identity module, audio input/output ports, video input/output ports, an earphone port and/or the like.

The identity module is the chip for storing various kinds of information for authenticating a use authority of the mobile terminal 100 and can include User Identify Module (UIM), Subscriber Identify Module (SIM), Universal Subscriber Identity Module (USIM) and/or the like. A device having the identity module (hereinafter called 'identity device') can be manufactured as a smart card. Therefore, the identity device is connectible to the mobile terminal 100 via the corresponding port.

When the mobile terminal 110 is connected to an external cradle, the interface unit 170 becomes a passage for supplying the mobile terminal 100 with a power from the cradle or a passage for delivering various command signals inputted from the cradle by a user to the mobile terminal 100. Each of the various command signals inputted from the cradle or the power can operate as a signal enabling the mobile terminal 100 to recognize that it is correctly loaded in the cradle.

The controller 180 typically controls the overall operations of the mobile terminal 100. For example, the controller 180 performs the control and processing associated with voice calls, data communications, video calls, etc. The controller 180 may include a multimedia module 181 that provides multimedia playback. The multimedia module 181 may be configured as part of the controller 180, or implemented as a separate component.

Moreover, the controller 180 is able to perform a pattern (or image) recognizing process for recognizing a writing input and a picture drawing input carried out on the touchscreen as characters or images, respectively.

The power supply unit 190 provides power required by the various components for the mobile terminal 100. The power may be internal power, external power, or combinations thereof.

Various embodiments described herein may be implemented in a computer-readable medium using, for example, computer software, hardware, or some combination thereof. For a hardware implementation, the embodiments described herein may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a selective combination thereof. Such embodiments may also be implemented by the controller 180.

For a software implementation, the embodiments described herein may be implemented with separate software modules, such as procedures and functions, each of which perform one or more of the functions and operations described herein. The software codes can be implemented with a software application written in any suitable programming language and may be stored in memory such as the memory 160, and executed by a controller or processor, such as the controller 180.

FIG. 2A is a front perspective diagram of a mobile terminal according to one embodiment of the present invention.

The mobile terminal 100 shown in the drawing has a bar type terminal body. Yet, the mobile terminal 100 may be implemented in a variety of different configurations. Examples of such configurations include folder-type, slide-type, rotational-type, swing-type and combinations thereof. For clarity, further disclosure will primarily relate to a bar-type mobile terminal 100. However such teachings apply equally to other types of mobile terminals.

Referring to FIG. 2A, the mobile terminal 100 includes a case (casing, housing, cover, etc.) configuring an exterior thereof. In the present embodiment, the case can be divided into a front case 101 and a rear case 102. Various electric/electronic parts are loaded in a space provided between the front and rear cases 101 and 102. Optionally, at least one middle case can be further provided between the front and rear cases 101 and 102 in addition.

The cases 101 and 102 are formed by injection molding of synthetic resin or can be formed of metal substance such as stainless steel (STS), titanium (Ti) or the like for example.

A display 151, an audio output unit 152, a camera 121, user input units 130/131 and 132, a microphone 122, an interface 180 and the like can be provided to the terminal body, and more particularly, to the front case 101.

The display 151 occupies most of a main face of the front case 101. The audio output unit 151 and the camera 121 are provided to an area adjacent to one of both end portions of the display 151, while the user input unit 131 and the microphone 122 are provided to another area adjacent to the other end portion of the display 151. The user input unit 132 and the interface 170 can be provided to lateral sides of the front and rear cases 101 and 102.

The input unit 130 is manipulated to receive a command for controlling an operation of the terminal 100. And, the input unit 130 is able to include a plurality of manipulating units 131 and 132. The manipulating units 131 and 132 can be named a manipulating portion and may adopt any mechanism of a tactile manner that enables a user to perform a manipulation action by experiencing a tactile feeling.

Content inputted by the first or second manipulating unit 131 or 132 can be diversely set. For instance, such a command as start, end, scroll and the like is inputted to the first manipulating unit 131. And, a command for a volume adjustment of sound outputted from the audio output unit 152, a command for a switching to a touch recognizing mode of the display 151 or the like can be inputted to the second manipulating unit 132.

Figure 2B:
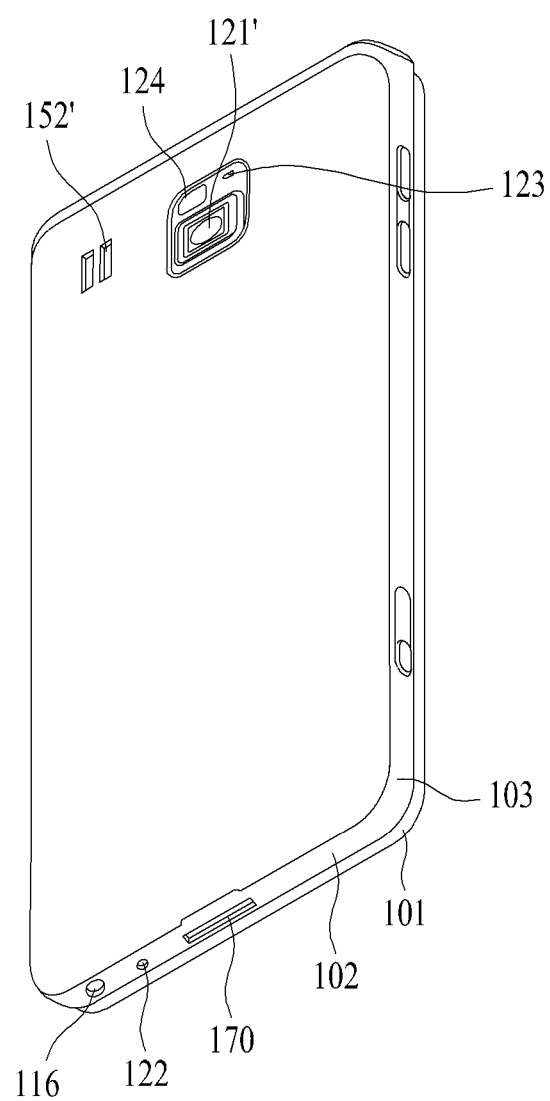
FIG. 2B is a perspective diagram of a backside of the mobile terminal shown in FIG. 2A.

FIG. 2B is a perspective diagram of a backside of the terminal shown in FIG. 2A.

Referring to FIG. 2B, a camera 121' can be additionally provided to a backside of the terminal body, and more particularly, to the rear case 102. The camera 121 has a photographing direction that is substantially opposite to that of the former camera 121 shown in FIG. 21A and may have pixels differing from those of the firmer camera 121.

Preferably, for instance, the former camera 121 has low pixels enough to capture and transmit a picture of user's face for a video call, while the latter camera 121' has high pixels for capturing a general subject for photography without transmitting the captured subject. And, each of the cameras 121 and 121' can be installed at the terminal body to be rotated or popped up.

A flash 123 and a mirror 124 are additionally provided adjacent to the camera 121'. The flash 123 projects light toward a subject in case of photographing the subject using the camera 121'. In case that a user attempts to take a picture of the user (self-photography) using the camera 121', the mirror 124 enables the user to view user's face reflected by the mirror 124.

An additional audio output unit 152' can be provided to the backside of the terminal body. The additional audio output unit 152' is able to implement a stereo function together with the former audio output unit 152 shown in FIG. 2A and may be used for implementation of a speakerphone mode in talking over the terminal.

A broadcast signal receiving antenna 124 can be additionally provided to the lateral side of the terminal body as well as an antenna for communication or the like. The antenna 124 constructing a portion of the broadcast receiving module 111 shown in FIG. 1 can be retractably provided to the terminal body.

A power supply unit 190 for supplying a power to the terminal 100 is provided to the terminal body. And, the power supply unit 190 can be configured to be built within the terminal body. Alternatively, the power supply unit 190 can be configured to be detachably connected to the terminal body.

A touchpad for detecting a touch can be additionally provided to the rear case 102. The touchpad can be configured in a light transmittive type like the display 151. In this case, if the display 151 is configured to output visual information from its both faces, it is able to recognize the visual information via the touchpad as well. The information outputted from both of the faces can be entirely controlled by the touchpad. Alternatively, a display is further provided to the touchpad so that a touchscreen can be provided to the rear case 102 as well.

The touchpad is activated by interconnecting with the display 151 of the front case 101. The touchpad can be provided in rear of the display 151 in parallel. The touchpad can have a size equal to or smaller than that of the display 151.

In the following description, a method of controlling a mobile terminal 100 and associated embodiments implementable in the mobile terminal are explained with reference to attached drawings.

For clarity, assume that the mobile terminal 100 mentioned in the following includes at least one of the components shown in FIG. 1. Specifically, the mobile terminal 100 according to the present invention can include a user input unit 130, a sensing unit 140, a display 151, a memory 160, and a controller 180. Since the present invention can be more easily implemented in case that the display 151 is implemented by a touchscreen 151, the present invention is explained in an assumption that the display 151 corresponds to the touchscreen 151 in the following description. In case that the user input unit 130 is configured in a manner of including a touch sensor 137, the touchscreen 151 may be used as the user input unit 130.

The mobile terminal 100 according to one embodiment of the present invention is explained in an assumption that a cover designed to protect the display 151 is installed in a housing 103. An opening part is formed in the cover to make at least a part of the display 151 to be exposed when the cover becomes a closed state on the display 151.

The sensing unit 140 senses whether the cover is opened on the display 151. The sensing unit 140 may include a terrestrial magnetism sensor. As an example, a prescribed part of the cover is equipped with a magnet and the terrestrial magnetism sensor can be installed in a position corresponding to the magnet of the cover when the cover becomes a closed state on the display 151. According to a contact or proximity between the magnet of the cover and the terrestrial magnetism sensor, whether the cover is opened on the display 151 can be sensed. When the magnet of the cover and the terrestrial magnetism sensor are adjacent to each other within a predetermined distance, it may be recognized as a state that the cover is closed on the display 151.

In case of the state that the cover is closed on the display 151, an area of the display 151 corresponding to the opening part can be exposed.

Figure 3:
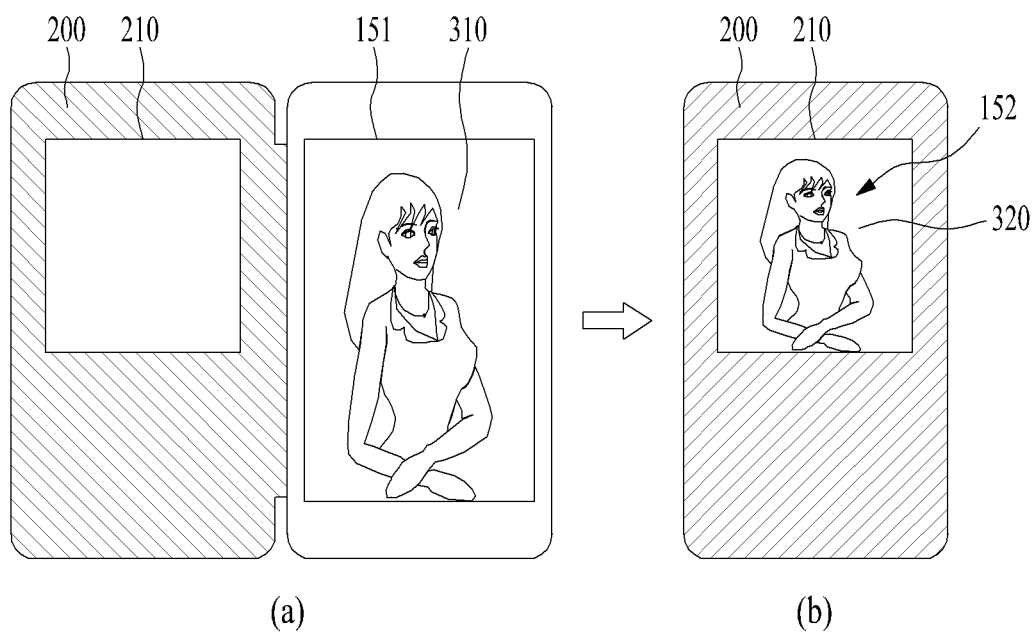
FIG. 3 is a diagram for explaining an example of a screen displayed in a display in case that a cover changes from an opened state to a closed state in a mobile terminal according to one embodiment of the present invention.

FIG. 3 is a diagram for explaining an example of a screen displayed in a display in case that a cover changes from an opened state to a closed state in a mobile terminal according to one embodiment of the present invention.

Referring to FIG. 3 (a), a first application is executing in a state that the cover 200 is opened and an execution screen 310 of the first application is displayed in the display 151.

As depicted in the FIG. 3 (b), if the cover 200 is closed on the display 151, the sensing unit 140 senses the closing of the cover 200.

If the closing of the cover 200 is detected while the first application is executing, the controller 180 controls the display 151 to change a display state of the execution screen 310 of the first application to make the display state correspond to a position and a size of the opening part 210 of the cover 200. In particular, the controller 180 controls the display 151 to change the display state of the execution screen 310 of the first application to make the display state correspond to a position and a size of a specific area 152 of the display 151 that corresponds to the opening part 210. Hence, in the state that the cover 200 is closed, an execution screen 320 of the first application in which the display state has changed is displayed via the display 151 which is exposed through the opening part 210 of the cover 200.

The change for the display state of the execution screen 310 of the first application may include at least one of resizing the execution screen 310 of the first application, changing a position, and changing on whether to display a component object. The resizing of the execution screen 310 of the first application means to adjust the execution screen 310 of the first application to a size of the specific area 152. The changing a position of the execution screen 310 of the first application means to change a display position to make the execution screen 310 of the first application to be displayed in the specific area 152. And, the changing on whether to display a component object of the execution screen 310 of the first application means to display a part of the component objects which construct the execution screen 310 of the first application in the specific area 152 only or to change the display state of at least a part of the component objects which construct the execution screen 310 of the first application.

Figure 4:
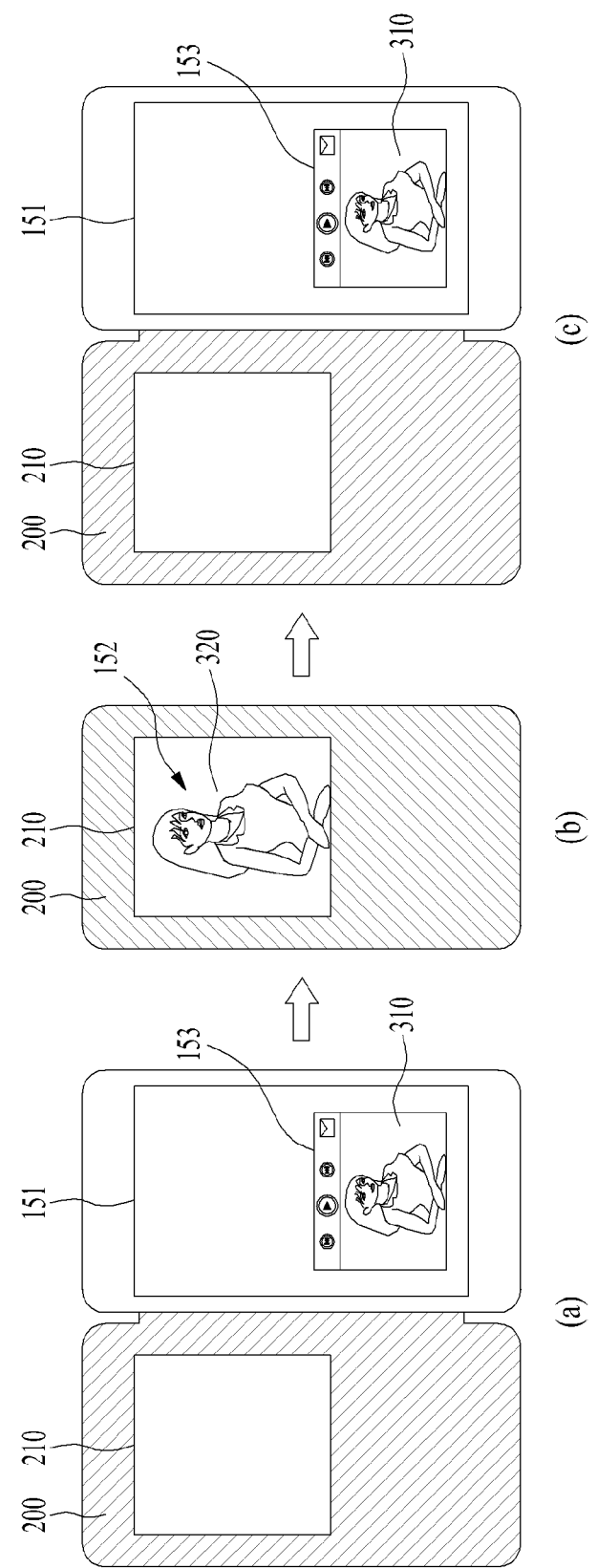
FIG. 4 is a diagram for explaining a different example of a screen displayed in a display in case that a cover changes from an opened state to a closed state in a mobile terminal according to one embodiment of the present invention.

FIG. 4 is a diagram for explaining a different example of a screen displayed in a display in case that a cover changes from an opened state to a closed state in a mobile terminal according to one embodiment of the present invention.

Referring to FIG. 4 (a), the first application is executing in the state that the cover 200 is opened and the execution screen 310 of the first application is displayed in the display 151. A difference between the present embodiment and the embodiment depicted in FIG. 3 is that the execution screen 310 of the first application is displayed in a form of a partial screen 153 capable of changing its position on the display 151.

As shown in FIG. 4 (b), if the cover 200 is closed on the display 151, the sensing unit 140 senses the closing of the cover 200.

If the closing of the cover 200 is detected while the first application is executing, the controller 180 controls the display 151 to change a display state of the execution screen 310 of the first application to make the display state correspond to a position and a size of the opening part 210 of the cover 200. In particular, the controller 180 controls the display 151 to change the display state of the execution screen 310 of the first application to make the display state correspond to a position and a size of a specific area 152 of the display 151 that corresponds to the opening part 210. Hence, in the state that the cover 200 is closed, an execution screen 320 of the first application in which the display state has changed is displayed via the display 151 which is exposed through the opening part 210 of the cover 200.

If the closing of the cover 200 is detected, the controller 180 can control the display 151 to change the display state of the execution screen 310 of the first application to make the display state correspond to the position and the size of the opening part 210 irrespective of whether a position of the partial screen 153 on the display 151 before the cover 200 is closed corresponds to the specific area 152 of the display 151 corresponding to the opening part 210.

As depicted in FIG. 4 (c), if opening of the cover 200 is detected while the first application is executed, the controller 180 controls the display 151 to make the execution screen 310 of the first application to be displayed in the form of the partial screen 153 again. A position of the partial screen 153 on the display 151 shown in FIG. 4 (c) and a position of the partial screen on the display 151 shown in FIG. 4 (a) may be identical to each other, by which the present invention may be non-limited.

According to the aforementioned embodiments in relation to FIG. 3 and FIG. 4, if a user closes the cover 200 in the middle of using the first application in the state that the cover 200 is opened, the first application can be seamlessly executed. For instance, if the cover 200 is closed in the middle of playing a video file in the state that the cover 200 is opened, the user can continuously watch the video using the specific area 152 of the display 151 exposed through the opening part 210.

Meanwhile, according to the present invention, two or more opening parts can be formed in the cover 200. Regarding this, it is explained with reference to FIG. 5 and FIG. 6.

Figure 5:
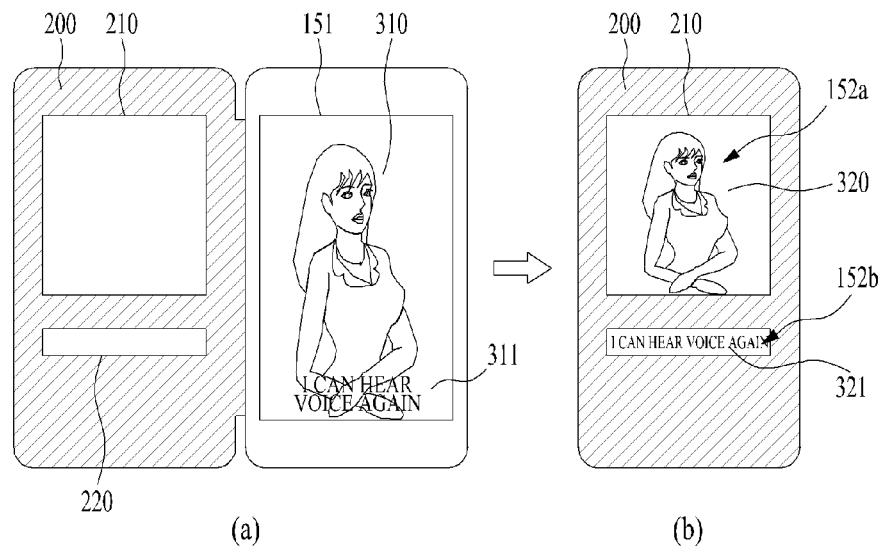
FIG. 5 is a diagram for explaining an example of a screen displayed in a display in case that a cover equipped with two or more opening parts changes from an opened state to a closed state in a mobile terminal according to one embodiment of the present invention.

FIG. 5 is a diagram for explaining an example of a screen displayed in a display in case that a cover equipped with two or more opening parts changes from an opened state to a closed state in a mobile terminal according to one embodiment of the present invention.

Referring to FIG. 5 (a), the first application is executing in the state that the cover 200 is opened and the execution screen 310 of the first application is displayed in the display 151.

The cover 200 includes at least two opening parts. As an example, the cover includes a first opening part 210 and a second opening part 220 which is smaller than the first opening part in size. The second opening part 220 may corresponds to a rectangular form having a length of horizontal direction, by which the present invention may be non-limited.

As depicted in FIG. 5 (b), if the cover 200 is closed on the display 151, the sensing unit 140 senses the closing of the cover 200.

If the closing of the cover 200 is detected in the middle of executing the first application, the controller 180 controls the display 151 to change the display state of the execution screen 310 of the first application to make the display state correspond to the position and the size of the opening part 210/220. In particular, the controller 180 controls the display 151 to change the display state of the execution screen 310 of the first application to make the display state correspond to a position and a size of a specific area 152 of the display 151 that corresponds to the opening part 210. Hence, in the state that the cover 200 is closed, execution screens 320/321 of the first application in which the display state has changed are displayed via the display 151 which is exposed through the opening parts 210/220 of the cover 200.

In this case, the controller 180 controls the display 151 to display a first object of the execution screen of the first application in an area corresponding to the first opening part 210 and controls the display 151 to display a second object of the execution screen of the first application in an area corresponding to the second opening part 220. For clarity, the area on the display 151 corresponding to the first opening part 210 and the area on the display 151 corresponding to the second opening part 220 are called a first specific area 152a and a second specific area 152b, respectively.

The first object may include at least one of a still image, a video image, and a graphic image and the second object may include at least one of a text data, a subtitle data, and a caption data.

For instance, if the first application corresponds to a playback application of a video file including a subtitle data 311, when the cover 200 is closed on the display 151 in the middle of executing the first application, a video image 320 is displayed via the first specific area 152a corresponding to the relatively big first opening part 210 and a subtitle data 321 can be displayed via the second specific area 152b corresponding to the second opening part 220 which is smaller than the first opening part 210.

According to embodiment, if a display arrangement of the subtitle data 311 shown in FIG. 5 (a) corresponds to a vertical direction instead of a horizontal direction, the subtitle data 321 shown in FIG. 5 (b) in which the display state has changed may have the display arrangement of the horizontal direction which is a length direction of the second specific area 152b.

Figure 6:
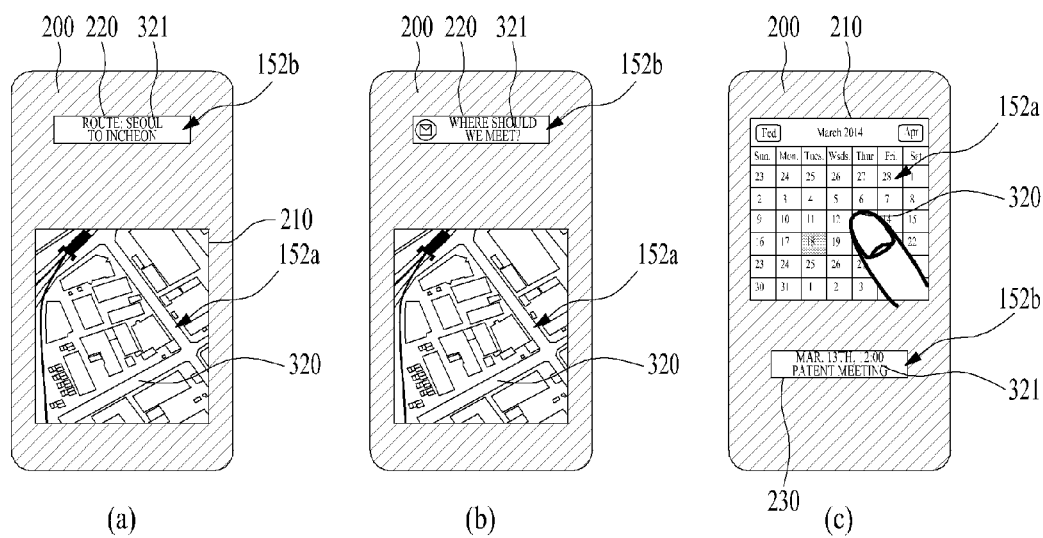
FIG. 6 is a diagram for explaining a different example of a screen displayed in a display in case that a cover equipped with two or more opening parts changes from an opened state to a closed state in a mobile terminal according to one embodiment of the present invention.

FIG. 6 is a diagram for explaining a different example of a screen displayed in a display in case that a cover equipped with two or more opening parts changes from an opened state to a closed state in a mobile terminal according to one embodiment of the present invention. FIG. 6 (a) to (c) corresponds to examples that the cover 200 is closed in the middle of executing the first application in the state that the cover 200 is opened.

Referring to FIG. 6 (a), if the closing of the cover 200 is detected in the middle of executing the first application, the controller 180 controls the display 151 to change the display state of the execution screen 310 of the first application to make the display state correspond to the position and the size of the opening part 210/220 of the cover 200. In this case, the controller 180 controls the display 151 to display a first object of the execution screen of the first application in a first specific area 152a corresponding to the first opening part 210 and controls the display 151 to display a second object of the execution screen of the first application in a second specific area 152b corresponding to the second opening part 220. Since changing the display state of the execution screen 310 of the first application is similar to the contents mentioned earlier with reference to FIG. 5, detailed explanation is omitted.

For instance, if the first application corresponds to a navigation application, when the cover 200 is closed on the display 151 in the middle of executing the first application, a map image is displayed via the first specific area 152a corresponding to the first opening part 210 which is relatively big and a text data 321 for guiding a road can be displayed via the second specific area 152b corresponding to the second opening part 220 which is smaller than the first opening part 210.

Referring to FIG. 6 (b), if the closing of the cover 200 is detected in the middle of executing the first application, the controller 180 controls the display 151 to change the display state of the execution screen 310 of the first application to make the display state correspond to the position and the size of the opening part of the cover 200.

In the example of FIG. 6 (b), two options are available.

First of all, similar to the contents mentioned earlier with reference to FIG. 3 and FIG. 4, when two or more opening parts 210/220 are formed in the cover 200, if the closing of the cover 200 is detected in the middle of executing the first application, the controller 180 controls the display 151 to change the display state of the execution screen 310 of the first application to make the display state correspond to the position and the size of the first opening part 210 of the cover 200. Hence, the changed execution screen 320 of the first application is displayed via the first specific area 152a only. And, if an external event occurs in the middle of executing the first application in the state that the cover 200 is closed, a notification message corresponding to the external event can be displayed via the second specific area 152b. For instance, if a text message is received in the middle of executing the first application, content of the received text message can be displayed via the second specific area 152b.

Secondly, similar to the content mentioned earlier with reference to FIG. 5, if the closing of the cover 200 is detected in the middle of executing the first application, the controller 180 controls the display 151 to change the display state of the execution screen 310 of the first application to make the display state correspond to the position and the size of the opening part 210/220 of the cover 200. In this case, the controller 180 controls the display 151 to display a first object of the execution screen of the first application in the first specific area 152a and controls the display 151 to display a second object of the execution screen of the first application in the second specific area 152b. And, if an external event occurs in the middle of executing the first application in the state that the cover 200 is closed, a notification message 330 corresponding to the external event can be displayed via the second specific area 152b. In this case, while the notification message 330 is displayed via the second specific area 152b, the second object may not be displayed or may be displayed via the first specific area 152a together with the first object.

Referring to FIG. 6 (c), if the closing of the cover 200 is detected in the middle of executing the first application, the controller 180 controls the display 151 to change the display state of the execution screen 310 of the first application to make the display state correspond to the position and the size of the first opening part 210 of the cover 200.

If a prescribed touch input is detected via the first specific area 152a in the middle of executing the first application in the state that the cover 200 is closed, the controller 180 can control the display 151 to display information on the first application corresponding to a part on which the touch input is detected via the second specific area 152b.

For instance, if the first application corresponds to a calendar application, when the cover 200 is closed on the display 151 in the middle of executing the first application, the execution screen 320 of the first application in which the display state has changed can be displayed in the first specific area 152a corresponding to the relatively big first opening part 210. If a user selects a part corresponding to a specific date on the execution screen 320 of the first application in which the display state has changed, a schedule, which is stored in a manner of being mapped to the specific data, can be displayed via the second specific area 152b.

Meanwhile, according to the present invention, the execution screen 320 of the first application, which is displayed via the specific area 152 in the middle of executing the first application in the state that the cover 200 is closed, can be captured. Capturing the execution screen is explained with reference to FIG. 7 in the following.

Figure 7:
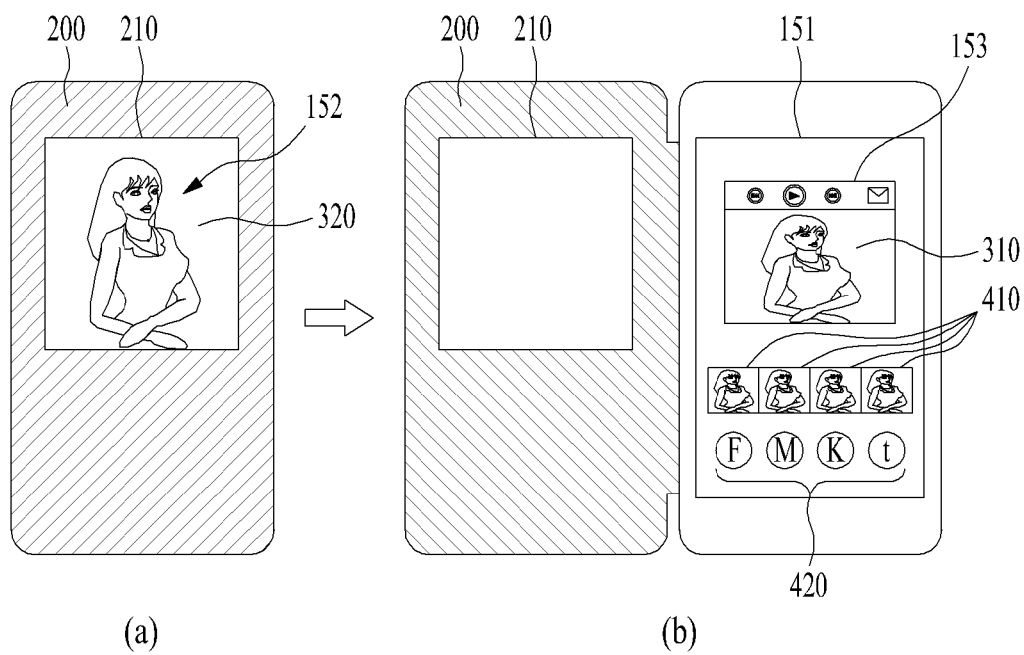
FIG. 7 is a diagram for explaining an example of a screen displayed in a display in case that a cover changes from a closed state to an opened state after a touch input of a predetermined form is detected in the closed state in a mobile terminal according to one embodiment of the present invention.

FIG. 7 is a diagram for explaining an example of a screen displayed in a display in case that a cover changes from a closed state to an opened state after a touch input of a predetermined form is detected in the closed state in a mobile terminal according to one embodiment of the present invention.

As mentioned earlier with reference to FIG. 3 and FIG. 4, FIG. 7 is explained in an assumption that the cover 200 is closed in the middle of executing the first application in the state that the cover 200 is opened.

Referring to FIG. 7 (a), if the closing of the cover 200 is detected while the first application is executing, the controller 180 controls the display 151 to change a display state of the execution screen 310 of the first application to make the display state correspond to a position and a size of the opening part 210 of the cover 200. In particular, the controller 180 controls the display 151 to change the display state of the execution screen 310 of the first application to make the display state correspond to a position and a size of a specific area 152 of the display 151 that corresponds to the opening part 210. Hence, in the state that the cover 200 is closed, an execution screen 320 of the first application in which the display state has changed is displayed via the specific area 152 of the display 151 which is exposed through the opening part 210 of the cover 200.

If a touch input of a predetermined form is detected via the specific area 152, the controller 180 can store the execution screen 320 of the first application, which is displayed in the specific area 152 when the touch input of the predetermined form is detected, as a captured image. As an example, the touch input of the predetermined form may correspond to a touch continuously performed on a part of the specific area 152 for more than a predetermined time, by which the present invention may be non-limited.

As depicted in FIG. 7 (b), if opening of the cover 200 is detected in the middle of executing the first application in the state that the cover 200 is closed, the controller 180 can control the display 151 to display the captured image 410 corresponding to the execution screen 320 of the first application, which is stored in a manner of being captured by the touch input of the predetermined form in the state that the cover 200 is closed. For instance, in the state of FIG. 7 (a), if 4 captured images are stored by 4 touch inputs, the 4 captured images 410 can be displayed in the display as shown in FIG. 7 (b).

According to embodiment, the controller 180 may control the display 151 to display icons 420 corresponding to an SNS (social network service) application or a message application. A user selects an icon 420 corresponding to an application to share the captured image 410 from the icons 420 and may be then able to share the captured image 410 with a different person.

And, according to embodiment, if the execution screen 310 of the first application is displayed via a whole screen of the display 151 before the cover 200 is closed in FIG. 7 (a), the controller 180 controls the execution screen 310 of the first application to be displayed via the whole screen of the display 151 in FIG. 7 (b). If the execution screen 310 of the first application is displayed via a partial screen 153 of the display 151 before the cover 200 is closed in FIG. 7 (a), the controller 180 can control the execution screen 310 of the first application to be displayed via the partial screen 153 of the display 151 in FIG. 7 (b).

Figure 8:
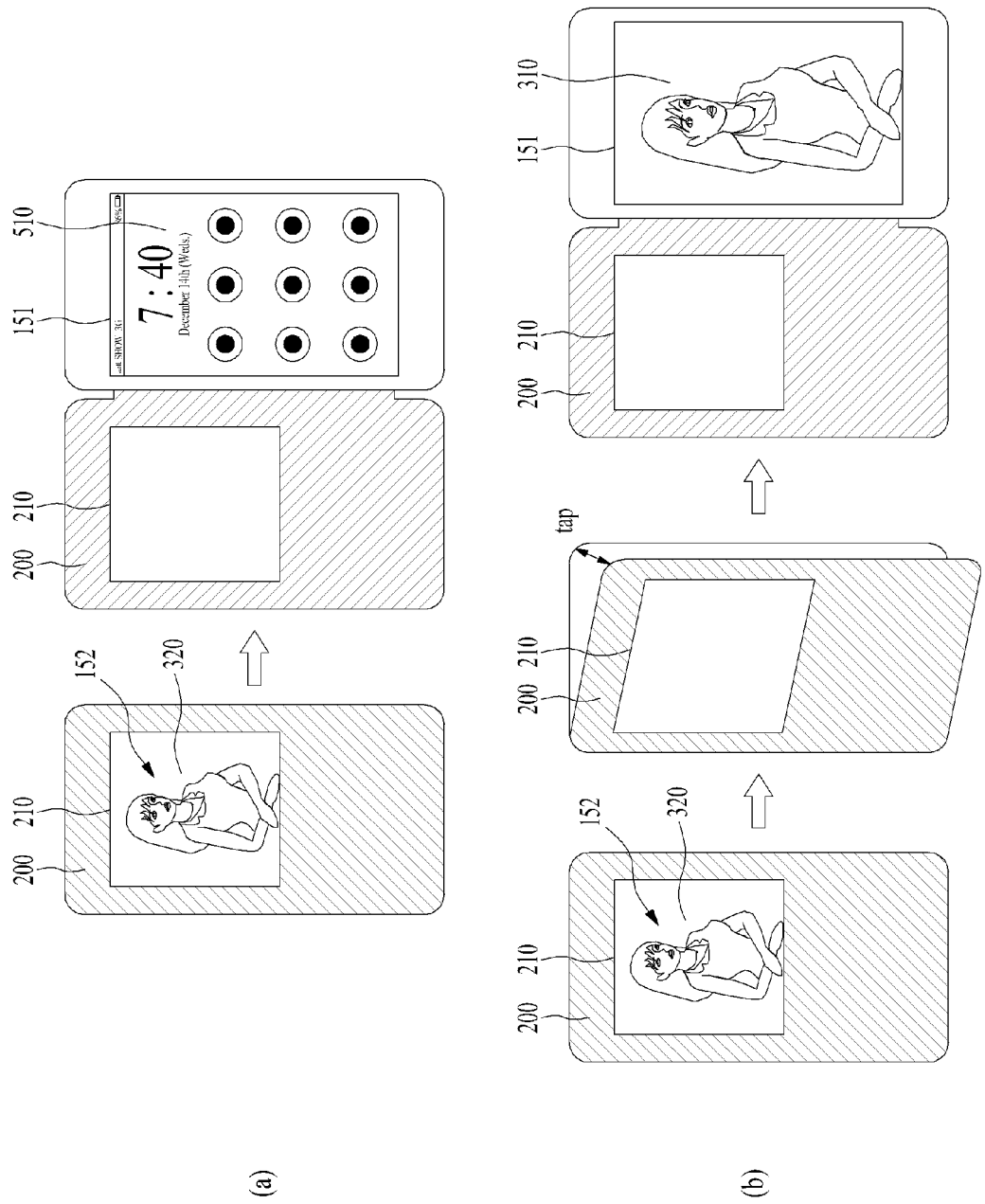
FIG. 8 is a diagram for explaining an example of a screen displayed in a display in case that a cover changes from a closed state to an opened state in accordance with a predetermined condition while a first application is executed in the closed state of the cover in a mobile terminal according to one embodiment of the present invention.

FIG. 8 is a diagram for explaining an example of a screen displayed in a display in case that a cover changes from a closed state to an opened state in accordance with a predetermined condition while a first application is executed in the closed state of the cover in a mobile terminal according to one embodiment of the present invention.

As mentioned earlier with reference to FIG. 3 and FIG. 4, FIG. 8 is explained in an assumption that the cover 200 is closed in the middle of executing the first application in the state that the cover 200 is opened.

Referring to FIG. 8, if the closing of the cover 200 is detected while the first application is executing, the controller 180 controls the display 151 to change a display state of the execution screen 310 of the first application to make the display state correspond to a position and a size of the opening part 210 of the cover 200. In particular, the controller 180 controls the display 151 to change the display state of the execution screen 310 of the first application to make the display state correspond to a position and a size of a specific area 152 of the display 151 that corresponds to the opening part 210. Hence, in the state that the cover 200 is closed, an execution screen 320 of the first application in which the display state has changed is displayed via the specific area 152 of the display 151 which is exposed through the opening part 210 of the cover 200.

Referring to FIG. 8 (a), if opening of the cover 200 is detected in the middle of executing the first application in the state that the cover 200 is closed, the controller 180 can control the display 151 to display a lock screen 510 or a home screen. FIG. 8 (a) shows a case that the lock screen 510 is displayed in the display 151 as an example. In this case, execution of the first application can be temporarily paused or terminated.

Referring to FIG. 8 (b), if opening of the cover 200 is detected after opening and closing of the cover 200 is detected at least once within a predetermined time in the state that the cover 200 is closed, the controller 180 can control the display 151 to display the execution screen 310 of the first application.

In particular, as depicted in FIG. 8 (a), if a user opens the cover 200 in the middle of executing the first application in the state that the cover 200 is closed, the controller controls the display 151 to display the lock screen 510 or the home screen. Yet, as depicted in FIG. 8 (b), if the user opens the cover 200 after performing an operation of tapping upon the display 151 with the cover 200 in a short time in the middle of executing the first application in the state that the cover 200 is closed, the controller can control the execution screen 310 of the first application to be displayed in the display 151.

According to the present embodiment, from the point of view of the user, the operation may be recognized as an intuitive operation of dropping content, which is used to be watched via the cover 200, to the display 151. By doing so, a fun function of the mobile terminal 100 can be emphasized.

Figure 9:
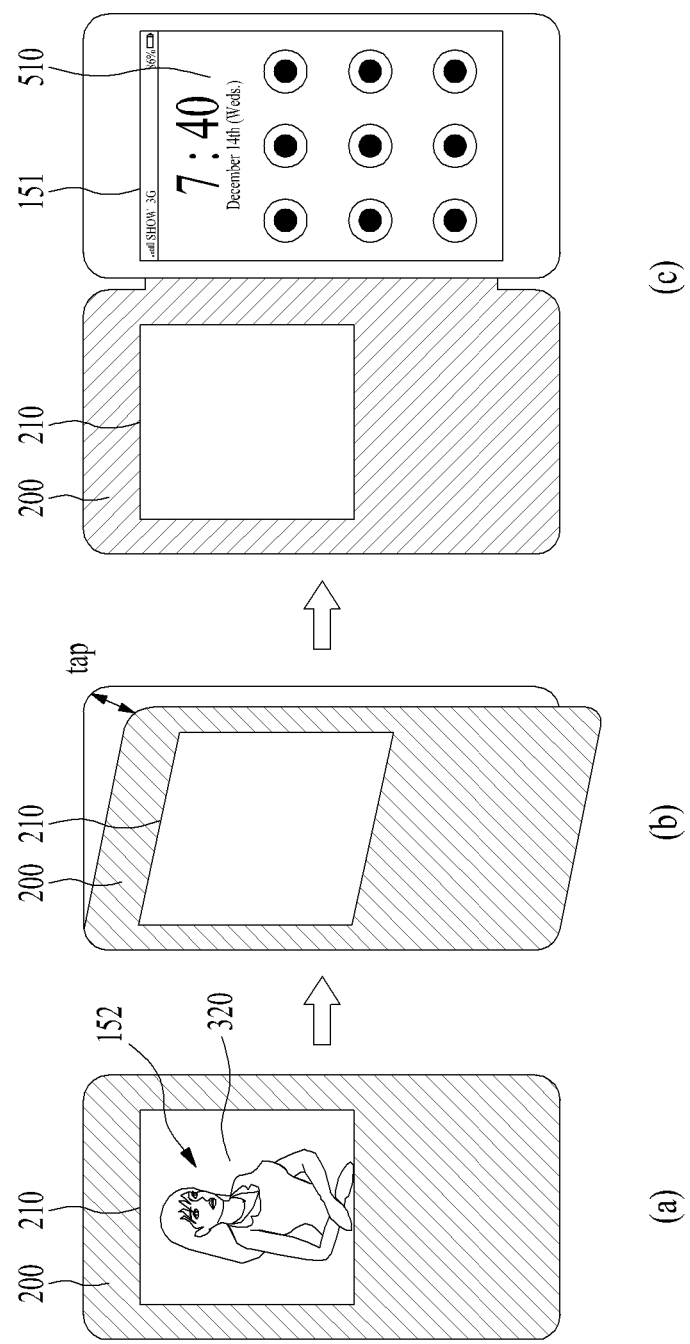
FIG. 9 is a diagram for explaining a different example of a screen displayed in a display in case that a cover changes from a closed state to an opened state in accordance with a predetermined condition while a first application is executed in the closed state in a mobile terminal according to one embodiment of the present invention.

FIG. 9 is a diagram for explaining a different example of a screen displayed in a display in case that a cover changes from a closed state to an opened state in accordance with a predetermined condition while a first application is executed in the closed state in a mobile terminal according to one embodiment of the present invention.

As mentioned earlier with reference to FIG. 3 and FIG. 4, FIG. 9 is explained in an assumption that the cover 200 is closed in the middle of executing the first application in the state that the cover 200 is opened.

Referring to FIG. 9 (a), if the closing of the cover 200 is detected while the first application is executing, the controller 180 controls the display 151 to change a display state of the execution screen 310 of the first application to make the display state correspond to a position and a size of the opening part 210 of the cover 200. In particular, the controller 180 controls the display 151 to change the display state of the execution screen 310 of the first application to make the display state correspond to a position and a size of a specific area 152 of the display 151 that corresponds to the opening part 210. Hence, in the state that the cover 200 is closed, an execution screen 320 of the first application in which the display state has changed is displayed via the display 151 which is exposed through the opening part 210 of the cover 200.

Referring to FIGS. 9 (b) and (c), if opening of the cover 200 is detected after the opening and the closing of the cover 200 is detected at least once within a predetermined time in the state that the cover 200 is closed, the controller 180 can terminate execution of the first application. In this case, the controller 180 can control the display 151 to display a lock screen or a home screen. FIG. 9 (c) shows a case that the lock screen 510 is displayed in the display 151 as an example.

According to embodiment, for a general case that the opening of the cover 200 is detected in the state that the cover is closed, the controller 180 can control the display 151 to display the execution screen 310 of the first application.

Figure 10:
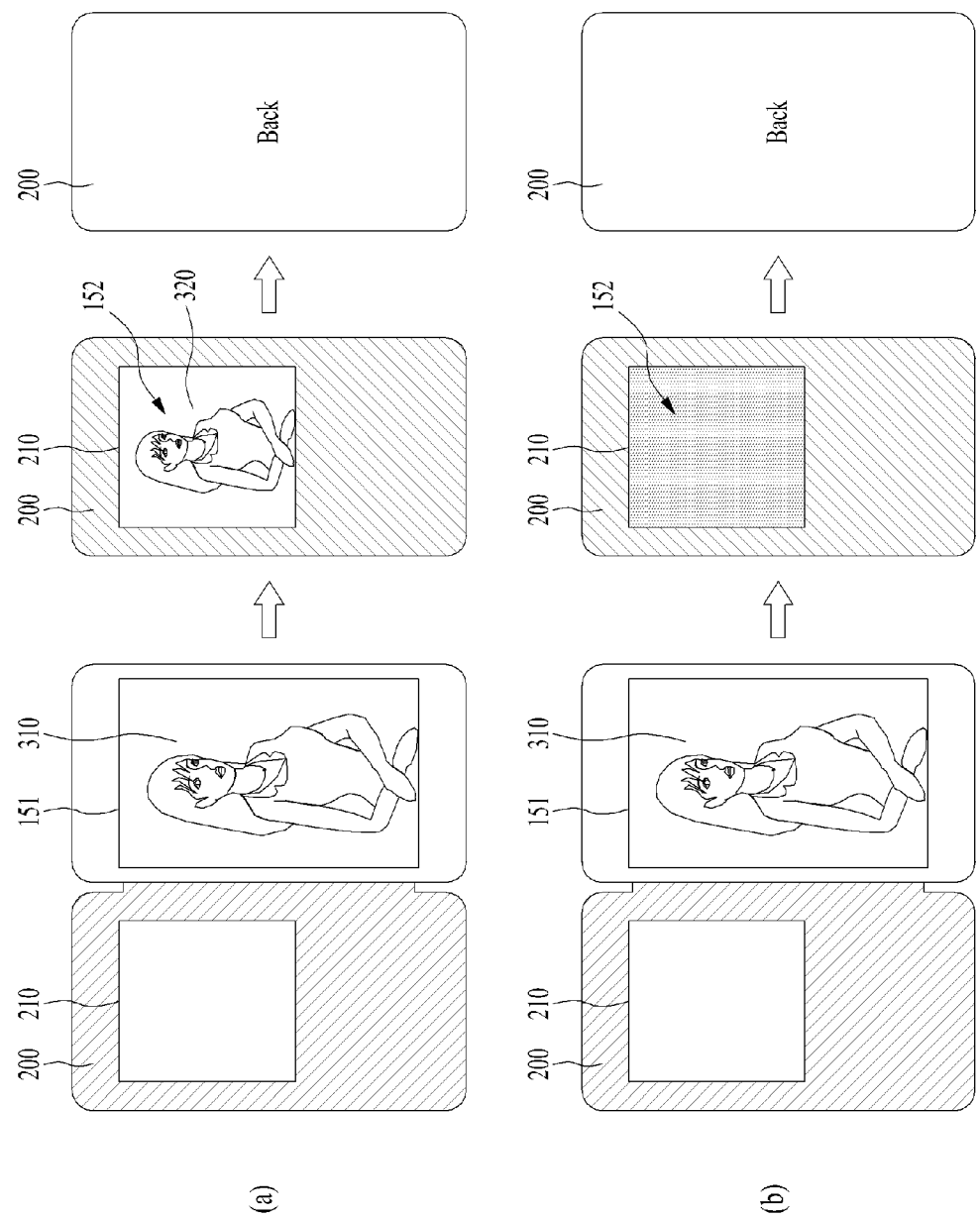
FIG. 10 is a diagram for explaining examples of terminating an execution of a first application in accordance with a predetermined condition in case that a cover changes from an opened state to a closed state while the first application is executed in the opened state in a mobile terminal according to one embodiment of the present invention.

FIG. 10 is a diagram for explaining examples of terminating execution of a first application in accordance with a predetermined condition in case that a cover changes from an opened state to a closed state while the first application is executed in the opened state in a mobile terminal according to one embodiment of the present invention.

First of all, referring to FIG. 10 (a), if the closing of the cover 200 is detected while the first application is executing in the state that the cover 200 is opened, the controller 180 controls the display 151 to change a display state of the execution screen 310 of the first application to make the display state correspond to a position and a size of the opening part 210 of the cover 200. In particular, the controller 180 controls the display 151 to change the display state of the execution screen 310 of the first application to make the display state correspond to a position and a size of a specific area 152 of the display 151 that corresponds to the opening part 210. Hence, in the state that the cover 200 is closed, an execution screen 320 of the first application in which the display state has changed is displayed via the display 151 which is exposed through the opening part 210 of the cover 200.

If the sensing unit 140 senses that the mobile terminal 100 rotates more than a predetermined range in one rotation axis, the controller 180 can terminate the execution of the first application. FIG. 10 (a) shows a case that the mobile terminal 100 has rotated 180 degrees in one rotation axis for example.

As a different example, referring to FIG. 10 (b), while the first application is executing in the state that the cover 200 is opened, if the sensing unit 140 detects that the cover 200 is closed within a predetermined time and the mobile terminal rotates more than a predetermined range in one rotation axis, the controller 180 may terminate the execution of the first application without a change of the display state of the execution screen 310 of the first application, which is performed to make the display state correspond to the position and the size of the opening part 210 of the cover 200.

Meanwhile, according to the present invention, when a user wants to temporarily memorize a part of contents displayed in the display 151, it may be able to display the part in a specific area 152 of the display 151 which is exposed via the opening part 210 of the cover 200 for a predetermined time. Regarding this, it is explained with reference to FIG. 11 in the following.

Figure 11:
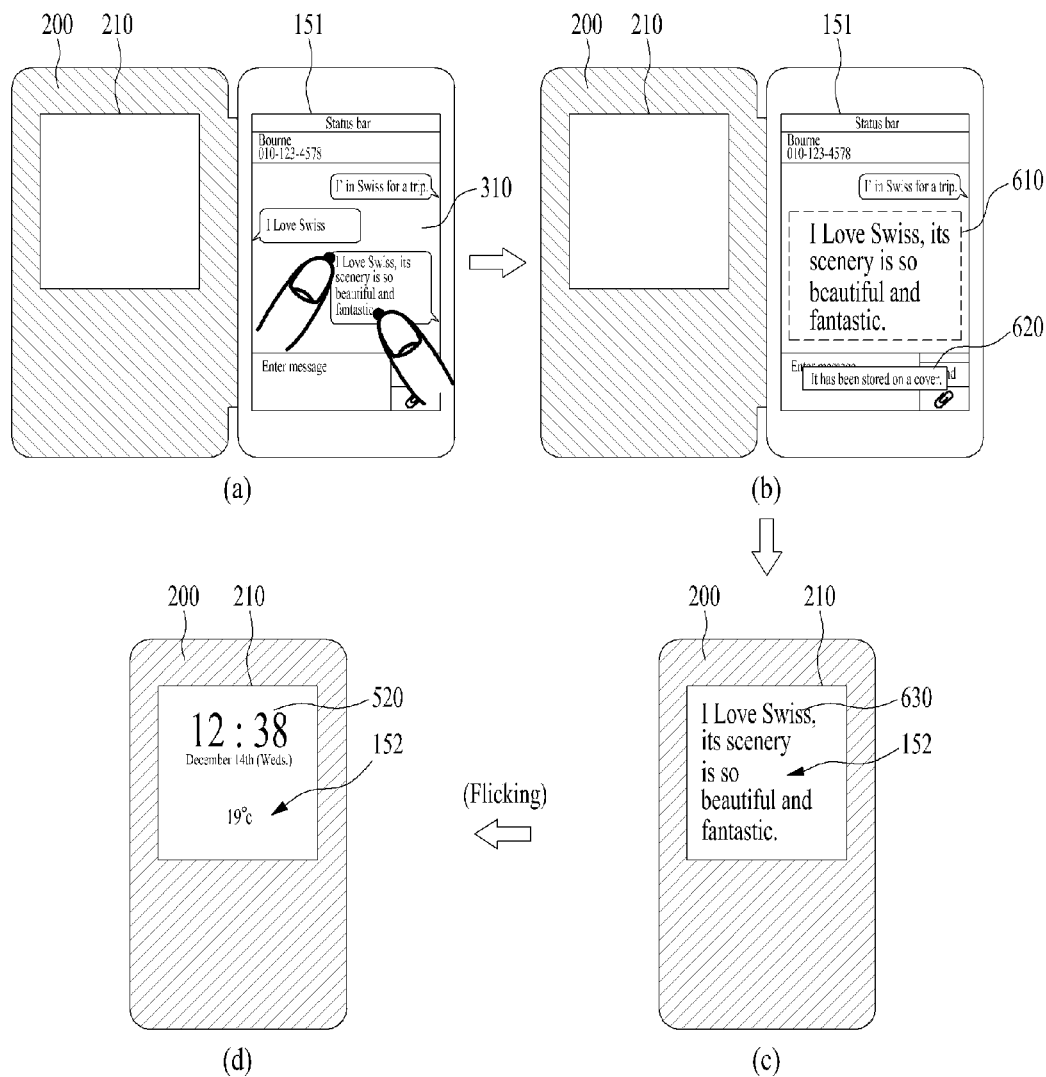
FIG. 11 is a diagram for explaining an example of a screen displayed in a display in case that a cover changes from an opened state to a closed state while a first application is executed in the opened state in a mobile terminal according to one embodiment of the present invention.

FIG. 11 is a diagram for explaining an example of a screen displayed in a display in case that a cover changes from an opened state to a closed state while a first application is executed in the opened state in a mobile terminal according to one embodiment of the present invention.

Referring to FIG. 11 (a), a first application is executing in the state that the cover 200 is opened and the execution screen 310 of the first application is displayed in the display 151. A user can select a part, which is intended to be temporarily stored by the user, from the execution screen 310 of the first application.

Referring to FIG. 10 (b), if a touch input for selecting a prescribed part from the execution screen 310 of the first application is detected, the controller 180 can temporarily store content of the execution screen of the first application corresponding to the touch input in the memory 160. In this case, the controller 180 can control the display 151 to output a first guide message 610 including the temporarily stored content of the execution screen of the first application and a second guide message informing the user of storing of the content in the memory 160 to make the user recognize it.

When the content of the execution screen of the first application selected by the user is temporarily stored, as depicted in FIG. 11 (c), if the closing of the cover 200 is detected, the controller 180 can control the display 151 to display the temporarily stored content 630 of the execution screen of the first application in the specific area 152 of the display 151 corresponding to the opening part 210.

The temporarily stored content 630 of the execution screen of the first application displayed in the specific area 152 may be automatically disappeared from the specific area 152 after a predetermined time elapses or may be disappeared from the specific area 152 by a predetermined touch input. Subsequently, as depicted in FIG. 11 (d), a mini home screen 520 corresponding to the closed state of the cover 200 can be displayed in the specific area 152.

Meanwhile, according to the present invention, if a predetermined user input is detected in the state that the cover 200 is closed, it may be able to enter a multitasking mode. Regarding this, it is explained with reference to FIG. 12 in the following.

Figure 12:
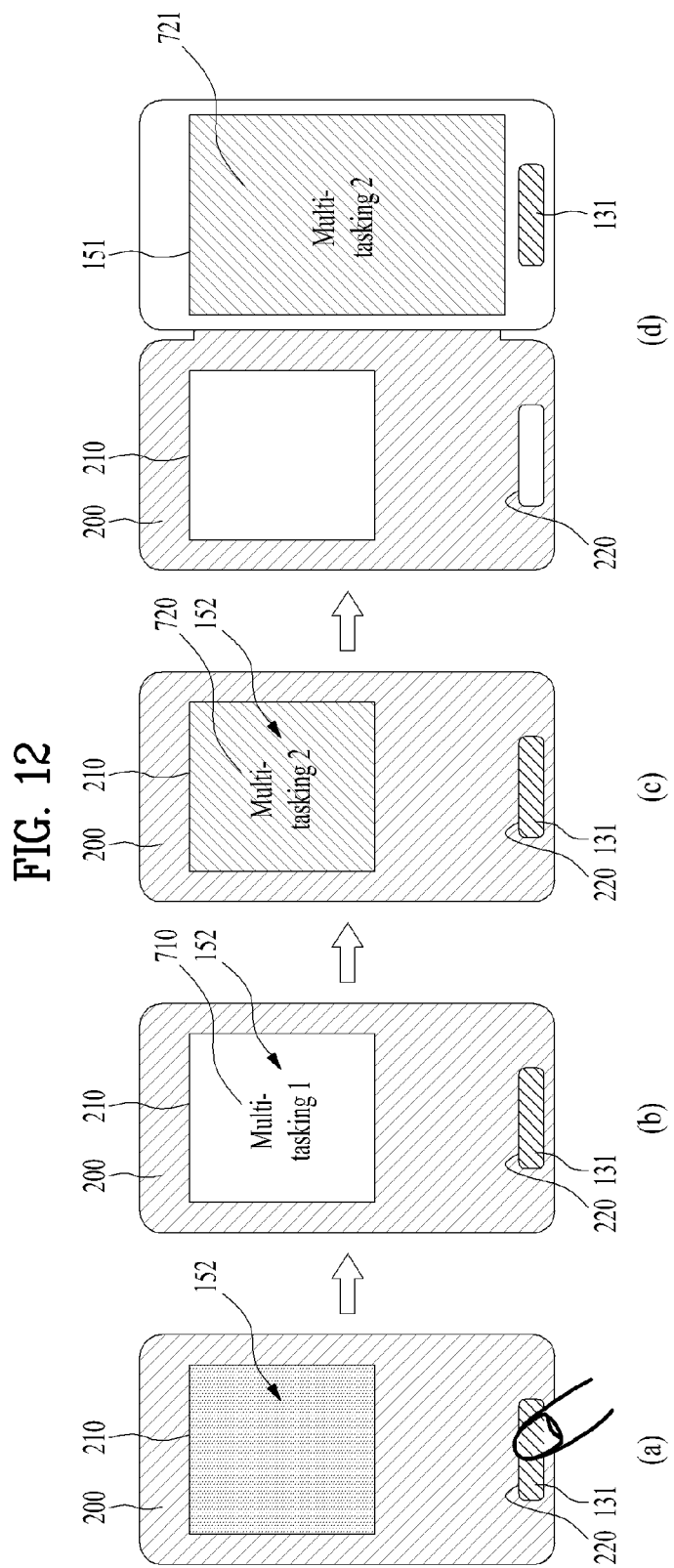
FIG. 12 is a diagram for explaining an example of entering a multitasking mode in case that a predetermined user input is detected in a closed state of a cover in a mobile terminal according to one embodiment of the present invention.

FIG. 12 is a diagram for explaining an example of entering a multitasking mode in case that a predetermined user input is detected in a closed state of a cover in a mobile terminal according to one embodiment of the present invention.

Referring to FIG. 12 (a), a first user input is received via a user input unit 130 in a state that the cover 200 is closed on the display 151. The cover 200 includes at least a first opening part 210 and a second opening part 220. The first opening part 210 exposes a specific area 152 of the display 151 and the second opening part 220 can expose a home button 131 in the state that the cover 200 is closed. The home button 131 may correspond to a hardware home button or a software home button installed in the display 151.

As an example, it is explained in an assumption that the first user input corresponds to a user input for pushing the home button 131 exposed via the second opening part 220 for more than a prescribed time.

If the first user input is detected in the state that the cover 200 is closed, the controller 180 enters a multitasking mode as depicted in FIG. 12 (b).

The multitasking mode may correspond to a mode capable of simultaneously executing or processing the predetermined number of applications, which are activated within a predetermined time. Or, the multitasking mode may mean a state that switching between the predetermined numbers of applications, which are activated within a predetermined time, can be freely performed. Since the multitasking mode is a widely known terminology to those skilled in the art and a user in environment of using the mobile terminal 100, detailed explanation on the multitasking mode is omitted.

Having entered the multitasking mode, the controller 180 controls the display 151 to display a first image 710 corresponding to a first application among images, which respectively correspond to the predetermined number of applications activated within the prescribed time, in a specific area 152 of the display 151 corresponding to the first opening part 210. As an example, the first application may correspond to an application which is activated immediately before entering the multitasking mode.

If a second user input is detected, as depicted in FIG. 12 (c), the controller 180 can control the display 151 to display a second image 720 corresponding to a second application among images, which respectively correspond to the predetermined number of applications, in the specific area 152 instead of the first image 710. As an example, the second user input may correspond to a user input for selecting a home button 131 or a touch input of a predetermined form for touching the specific area 152, by which the present invention may be non-limited.

As an example, the second application 720 may correspond to an application activated immediately before the first application is activated prior to entering the multitasking mode.

If opening of the cover 200 is detected in a state that the second image 720 is displayed in the specific area 152, as depicted in FIG. 12 (d), the controller 180 can control the display 151 to display an execution screen 721 of the second application corresponding to the second image 720.

According to the present embodiment, a user can easily check the applications activated within the prescribed time in a manner of entering the multitasking mode in the state that the cover 200 is closed and may execute a preferred application in a manner of taking such a simple action as opening the cover 200.

Meanwhile, according to the present invention, the user can check an external event occurred in the state that the cover 200 is closed and may enter a detail screen of a preferred event in a manner of opening the cover 200. Regarding this, it is explained with reference to FIG. 13.

Figure 13:
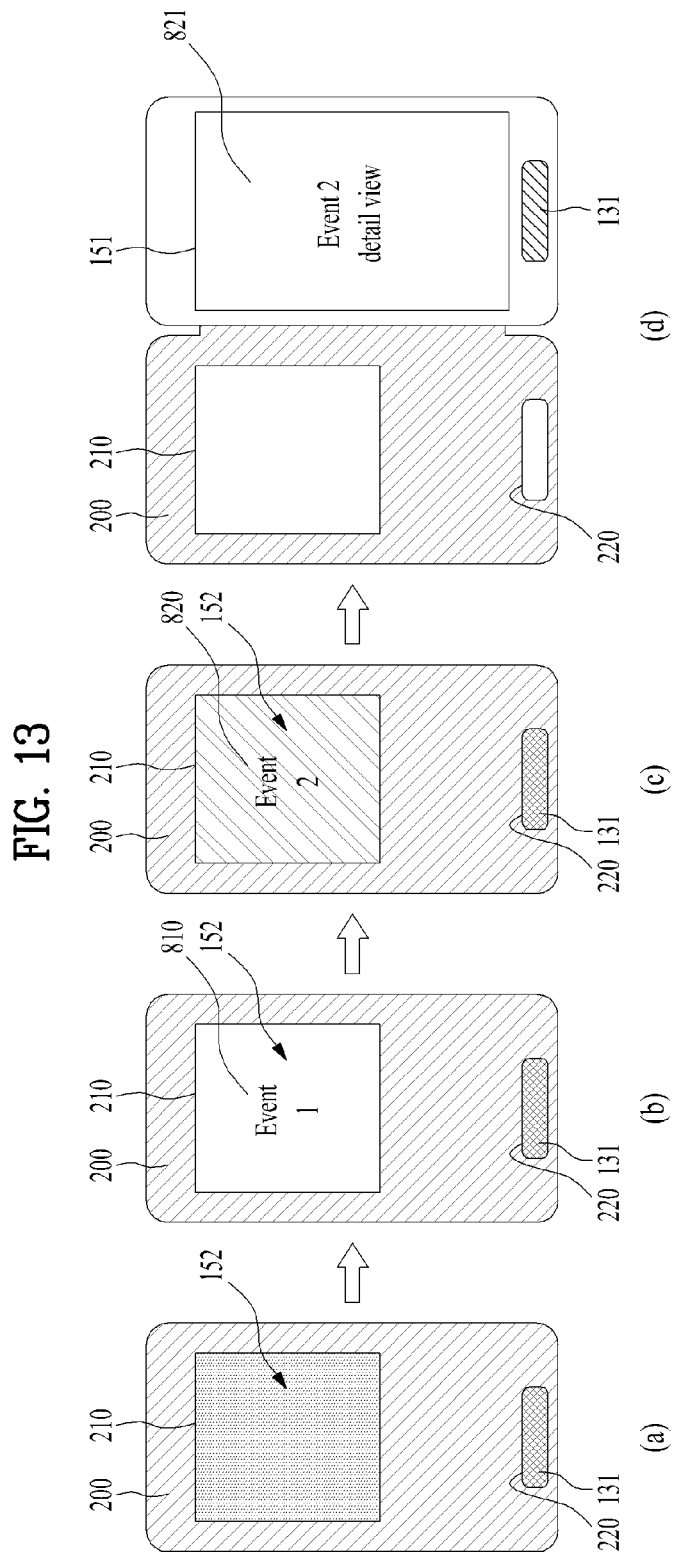

FIG. 13 is a diagram for explaining an example of an event occurred in a closed state of a cover in a mobile terminal according to one embodiment of the present invention. An external event may include receiving a call signal in absence, receiving a text message, receiving a message via a messenger application, receiving promotion information of a shopping application and the like.

Referring to FIG. 13 (a), the cover 200 includes at least a first opening part 210 and a second opening part 220. The first opening part 210 exposes a specific area 152 of the display 151 and the second opening part 220 can expose a home button 131 in the state that the cover 200 is closed. The home button 131 may correspond to a software home button installed in the display 151.

If at least one external event occurs in a state that the cover 200 is closed on the display 151, the controller 180 can make the home button 131 lighten. According to embodiment, if a user does not check the external event for a prescribed time after the external event has occurred, the controller 180 may lighten the home button 131 with a predetermined time interval.

If a first user input for selecting the home button 131 is detected in the state that the home button is lightened, as depicted in FIG. 13 (b), the controller 180 controls the display 151 to display a first mini screen 810 corresponding to a first event among a plurality of external events, which have occurred in the state that the cover 200 is closed, in a specific area 152 of the display 151 corresponding to the first opening part 210.

A plurality of the external events occurred in the closed state of the cover 200 mean events not checked by a user after the external event has occurred. As an example, the first event may correspond to a most recently occurred external event.

If a second user input is detected, as depicted in FIG. 13 (c), the controller 180 can control the display 151 to display a second mini screen 820 corresponding to a second event among a plurality of the external events, which have occurred in the state that the cover 200 is closed, in the specific area 152 instead of the first mini screen 810. As an example, the second user input may correspond to a user input for selecting a home button 131 or a touch input of a predetermined form for touching the specific area 152, by which the present invention may be non-limited.

As an example, the second event may correspond to an event occurred immediately before the first event occurs.

If opening of the cover 200 is detected in a state that the second mini screen 820 is displayed in the specific area 152, as depicted in FIG. 13 (d), the controller 180 can control the display 151 to display a detailed screen 821 corresponding to the second event in the display.

According to the present embodiment, a user can easily check the external events occurred in the closed state of the cover 200 and may check detail content of a preferred content in a manner of taking such a simple action as opening the cover 200.

Meanwhile, according to the present invention, it may enter a camera mode in a manner of activating a camera 121 in the state that the cover 200 is closed. Regarding this, it is explained with reference to FIG. 14 to FIG. 20 in the following.

Figure 14:
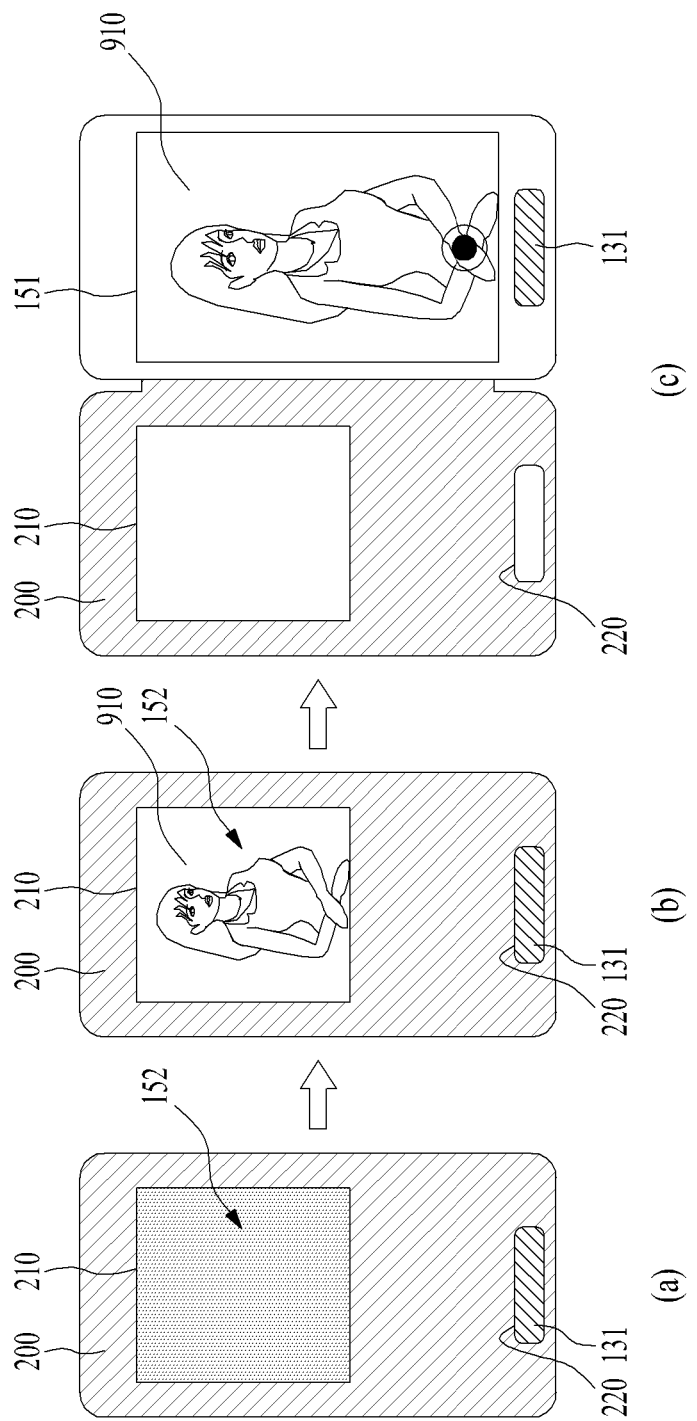
FIG. 14 is a diagram for explaining an example of using a camera in a closed state of a cover in a mobile terminal according to one embodiment of the present invention.

FIG. 14 is a diagram for explaining an example of using a camera in a closed state of a cover in a mobile terminal according to one embodiment of the present invention.

Referring to FIG. 14 (a), the cover 200 can include a first opening part 210 and a second opening part 220, by which the present invention may be non-limited. In a state that the cover 20 is closed, the first opening part 210 exposes a specific area 152 of the display 151 and the second opening part 220 may exposes a home button 131. The home button 131 may correspond to a hardware home button or a software home button installed in the display 151.

If a predetermined user input is detected in the state that the cover 200 is closed on the display 151, as depicted in FIG. 14 (b), the controller 180 can enter a camera mode which is a mode for activating a camera. The predetermined user input may correspond to continuously pushing the home button 131 or a volume key button for a predetermined time or simultaneously pushing the home button 131 and the volume key button, by which the present invention may be non-limited.

The controller 180 can control the display 151 to display a preview image 910 obtained by the camera 121 in the specific area 152 of the display 151 corresponding to the first opening part 210.

The preview image 910 may correspond to a part of the original of the preview image obtained by the camera 121 or an image which is resized to make the original of the preview image obtained by the camera 121 correspond to a size of the specific area 152.

A user may take a picture in case that the cover 200 is closed. If the volume key button is selected in a state that the preview image 910 is displayed in the specific area 152, the controller 180 captures the original of the preview image obtained by the camera 121 as it is and may be then able to store it as an image file, by which the present invention may be non-limited.

As depicted in FIG. 14 (c), if opening of the cover 200 is detected in the camera mode, the controller 180 can control the display 151 to display the preview image 910 obtained by the camera 121. The original of the preview image obtained by the camera can be displayed in a whole screen of the display 151 in a state that the cover 200 is opened.

Figure 15:
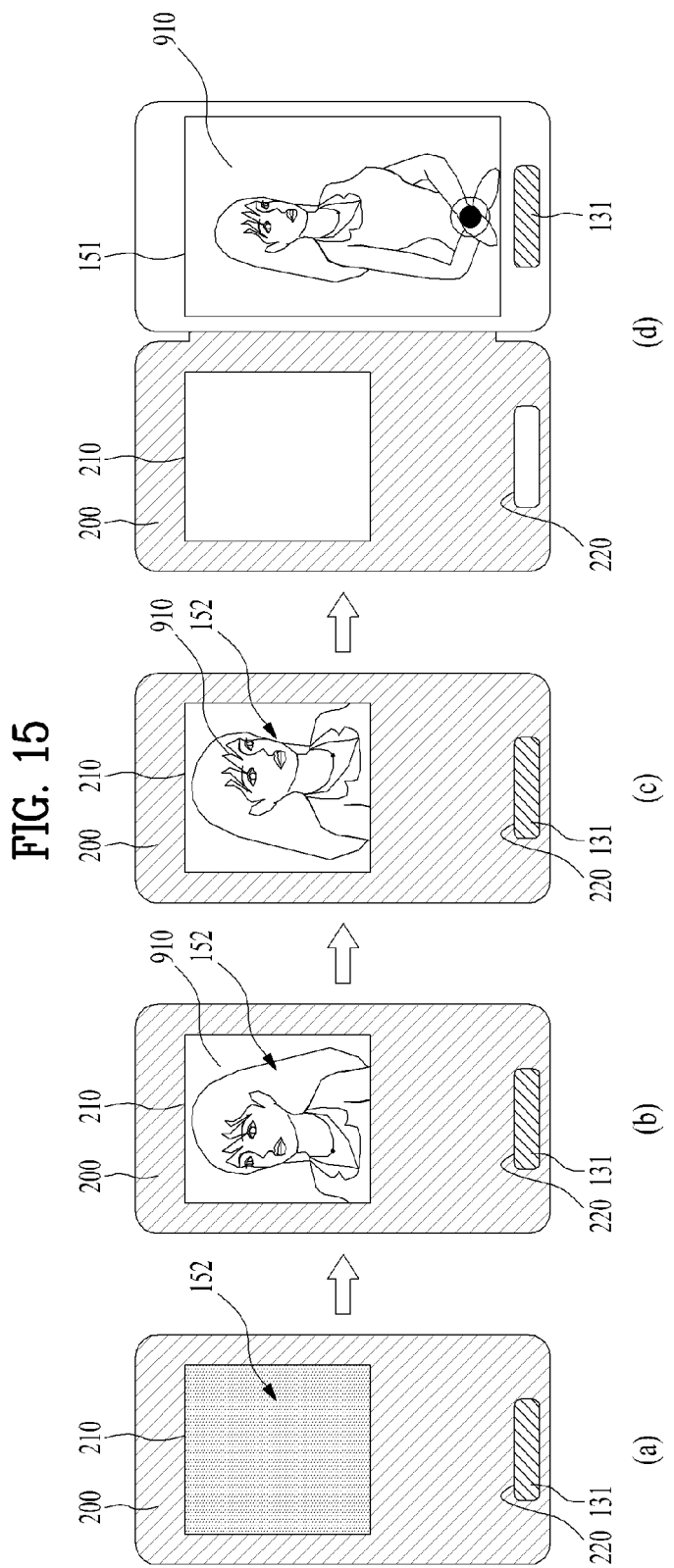
FIG. 15 is a diagram for explaining a different example of using a camera in a closed state of a cover in a mobile terminal according to one embodiment of the present invention.

FIG. 15 is a diagram for explaining a different example of using a camera in a closed state of a cover in a mobile terminal according to one embodiment of the present invention.

Referring to FIG. 15 (a), the cover 200 can include a first opening part 210 and a second opening part 220, by which the present invention may be non-limited. In a state that the cover 20 is closed, the first opening part 210 exposes a specific area 152 of the display 151 and the second opening part 220 may exposes a home button 131. The home button 131 may correspond to a hardware home button or a software home button installed in the display 151.

If a predetermined user input is detected in the state that the cover 200 is closed on the display 151, as depicted in FIG. 15 (b), the controller 180 can enter a camera mode which is a mode for activating a camera 121. The predetermined user input may correspond to continuously pushing the home button 131 or a volume key button for a predetermined time or simultaneously pushing the home button 131 and the volume key button, by which the present invention may be non-limited.

The controller 180 can control the display 151 to display a preview image 910 obtained by the camera 121 in the specific area 152 of the display 151 corresponding to the first opening part 210.

The preview image 910 may correspond to a part of the original of the preview image obtained by the camera 121 or an image which is resized to make the original of the preview image obtained by the camera 121 correspond to a size of the specific area 152.

The controller 180 recognizes a face of a person included in the preview image 910 obtained by the camera 121 and may change a display magnification to make a size of the recognized face correspond to a size of the first opening part 210. In particular, the controller 180 can change the display magnification of the preview image 910 to make the size of the recognized face correspond to the size of the specific area 152. And, the controller 180 can control the display 151 to display the preview image 910 in which the display magnification has changed in the specific area 152 to make the recognized face part of the preview image in which the display magnification has changed to be exposed via the first opening part 210.

In case that the cover 200 is closed, since the size of the specific area 152 exposed via the first opening part 210 is small, it may be difficult to clearly check the preview image 910. According to the present embodiment, since the face part is displayed in the specific area 152 in a manner of expanding the display magnification of the preview image 910 through face recognition, user convenience can be emphasized. In the present embodiment, the camera 121 may correspond to a front-side camera or a rear-side camera.

According to embodiment, the controller 180 may detect a movement of the recognized face. The controller 180 can control the display 151 to display the preview image 910 in which the display magnification has changed in the specific area 152 to make the recognized face part to be exposed via the first opening part 210 of the cover 200 based on the movement of the detected face. Hence, as depicted in FIG. 15 (c), the recognized face part of the preview image 910 in which the display magnification has changed can be continuously exposed via the first opening part 210 of the cover 200 according to a movement of a subject, which becomes a target of capturing.

As depicted in FIG. 15 (d), if opening of the cover 200 is detected in the camera 121 mode, the controller 180 can control the display 151 to display the preview image obtained by the camera 121. In the state that the cover 200 is opened, the original of the preview image obtained by the camera 121 can be displayed in a whole screen of the display 151.

Figure 16:
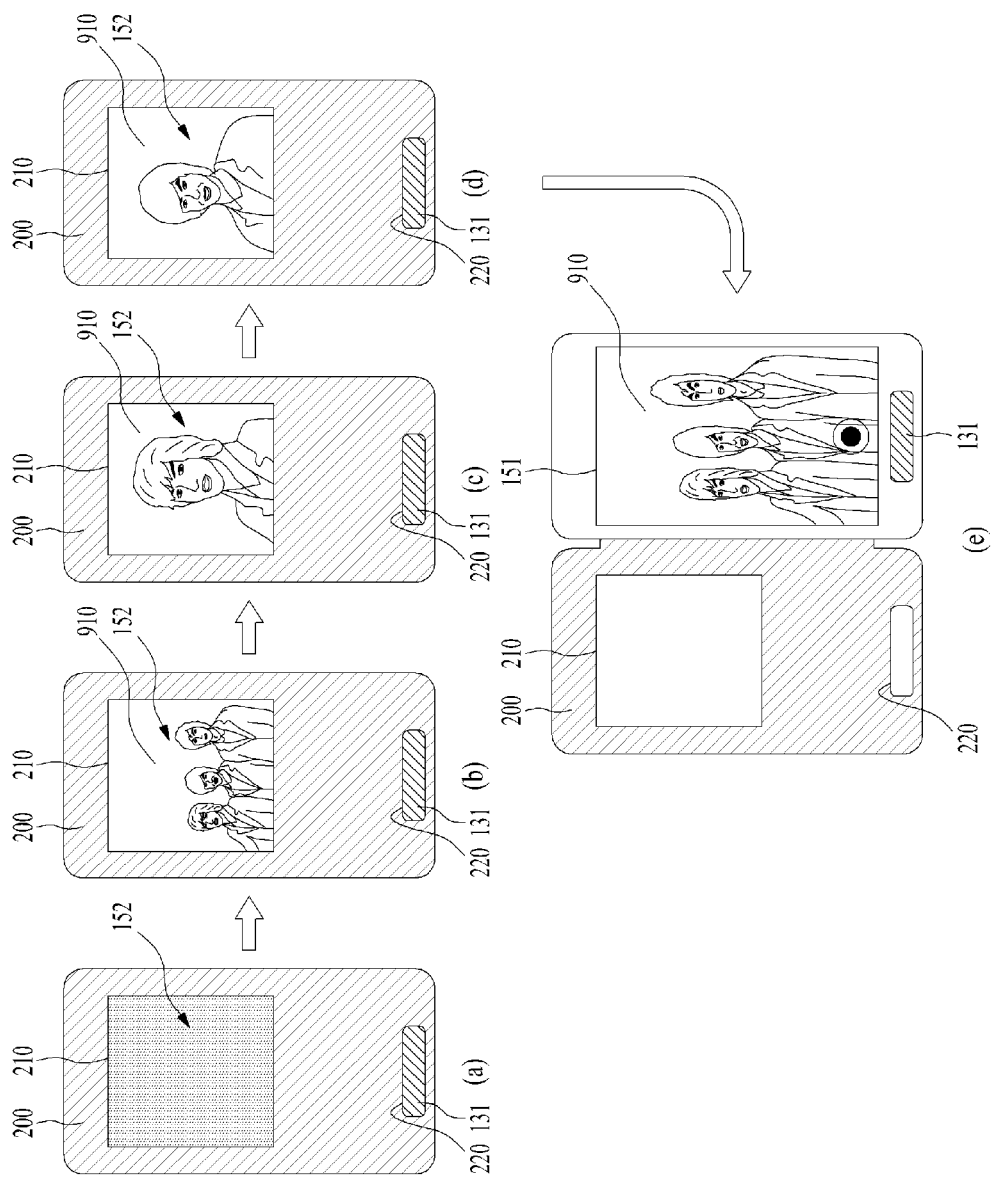
FIG. 16 is a diagram for explaining a further different example of using a camera in a closed state of a cover in a mobile terminal according to one embodiment of the present invention.

FIG. 16 is a diagram for explaining a further different example of using a camera in a closed state of a cover in a mobile terminal according to one embodiment of the present invention.

Referring to FIG. 16 (a), the cover 200 can include a first opening part 210 and a second opening part 220, by which the present invention may be non-limited. In a state that the cover 20 is closed, the first opening part 210 exposes a specific area 152 of the display 151 and the second opening part 220 may exposes a home button 131. The home button 131 may correspond to a hardware home button or a software home button installed in the display 151.

If a predetermined user input is detected in the state that the cover 200 is closed on the display 151, as depicted in FIG. 16 (b), the controller 180 can enter a camera mode which is a mode for activating a camera 121. The predetermined user input may correspond to continuously pushing the home button 131 or a volume key button for a predetermined time or simultaneously pushing the home button 131 and the volume key button, by which the present invention may be non-limited The controller 180 can control the display 151 to display a preview image 910 obtained by the camera 121 in the specific area 152 of the display 151 corresponding to the first opening part 210.

The preview image 910 may correspond to a part of the original of the preview image obtained by the camera 121 or an image which is resized to make the original of the preview image obtained by the camera 121 correspond to a size of the specific area 152.

The controller 180 recognizes a face of a person included in the preview image 910 obtained by the camera 121. Assume that the preview image 910 includes faces of two or more persons.

If a first user input is detected, as depicted in FIG. 16(C), the controller 180 can change a display magnification of the preview image 910 to make a size of a first face among the recognized two or more faces correspond to a size of the first opening part 210. In particular, the controller 180 can change the display magnification of the preview image 910 to make the size of the first face among the recognized two or more faces correspond to a size of the specific area 152. And, the controller 180 can control the display 151 to display the preview image 910 in which the display magnification has changed in the specific area 152 to make the first face part of the preview image 910 in which the display magnification has changed to be exposed via the first opening part 210.

The first user input may correspond to a touch input of a predetermined form touching the specific area 152, by which the present invention may be non-limited. For instance, the first user input may correspond to a flicking touch input touching a random part of the preview image 910 displayed in the specific area 152 in FIG. 16 (b) or a touch input touching a part corresponding to the first face among the preview image 910 displayed in the specific area 152.

If a second user input is detected in FIG. 16 (c), as depicted in FIG. 16 (d), the controller 180 can control the display 151 to display a preview image 910 in which the display magnification has changed in the specific area 152 to make a second face part, which is adjacent to the first face among the recognized two or more faces, to be exposed via the first opening part 210.

The second user input may correspond to a flicking touch input touching a random part of the preview image 910 displayed in the specific area 152, by which the present invention may be non-limited.

For instance, when the preview image 910 obtained by the camera 121 includes faces of three persons, if the second user input is detected in FIG. 16 (d), the controller 180 displays a third face, which is adjacent to the second face, via the specific area 152 in a manner of expanding the third face. If the second user input is detected again, the controller can display the first face via the specific area 152 in a manner of expanding the first face.

As depicted in FIG. 16 (e), if opening of the cover 200 is detected in the camera 121 mode, the controller 180 can control the display 151 to display the preview image 910 obtained by the camera 121. In the state that the cover 200 is opened, the original of the preview image obtained by the camera 121 can be displayed in a whole screen of the display 151.

Figure 17:
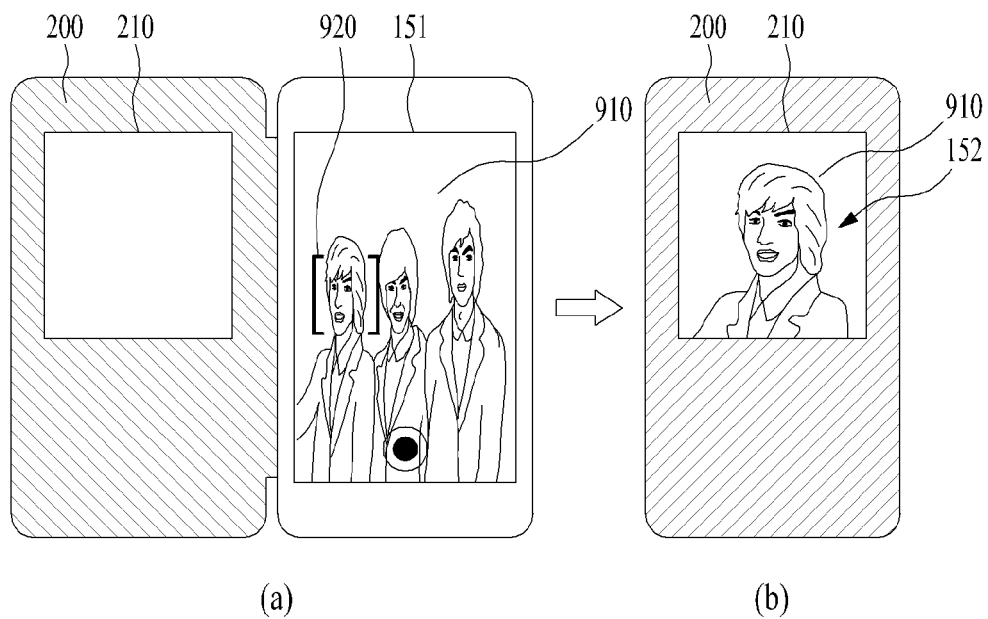
FIG. 17 is a diagram for explaining an example of a screen displayed in a display in case that a cover changes from an opened state to a closed state after a camera is activated in the opened state in a mobile terminal according to one embodiment of the present invention.

FIG. 17 is a diagram for explaining an example of a screen displayed in a display in case that a cover changes from an opened state to a closed state after a camera is activated in the opened state in a mobile terminal according to one embodiment of the present invention.

Referring to FIG. 17 (a), a camera 121 is activated in a state that the cover 200 is opened and a preview image 910 obtained by the camera 121 is displayed in the display 151.

The controller 180 detects a first user input for focusing the camera on a random part of the preview image 910. In this case, the controller 180 may control the display 151 to display an indicator 920 indicating a part, which is focused according to the first user input, in the preview image 910.

If closing of the cover 200 is detected, as depicted in FIG. 17 (b), the controller 180 can change a display magnification of the preview image 910 to make a size of the part, which is focused in accordance with the first user input, of the preview image 910 correspond to a size of the opening part 210. In particular, the controller 180 can change the display magnification of the preview image 910 to make the size of the focused part correspond to the size of the specific area 152. And, the controller 180 can control the display 151 to display the preview image 910 in which the display magnification has changed in the specific area 152 to make the focused part among the preview image 910 in which the display magnification has changed to be exposed via the opening part 210.

A user can take a picture in a state that the cover 200 is closed as well. As an example, if a volume key is selected in a state that the preview image 910 is displayed in the specific area 152, the controller 180 captures the original of the preview image obtained by the camera 121 as it is and may be then able to store it as an image file, by which the present invention may be non-limited.

In case that a user uses the camera 121 installed in the mobile terminal 100, the user focuses the camera on a preferred part within the preview image 910 and may wait for an instant suitable for capturing. According to the present embodiment, if the user closes the cover 200 after focusing the camera on the preferred part within the preview image 910, power consumption can be minimized while waiting for the instant suitable for the capturing.

Figure 18:
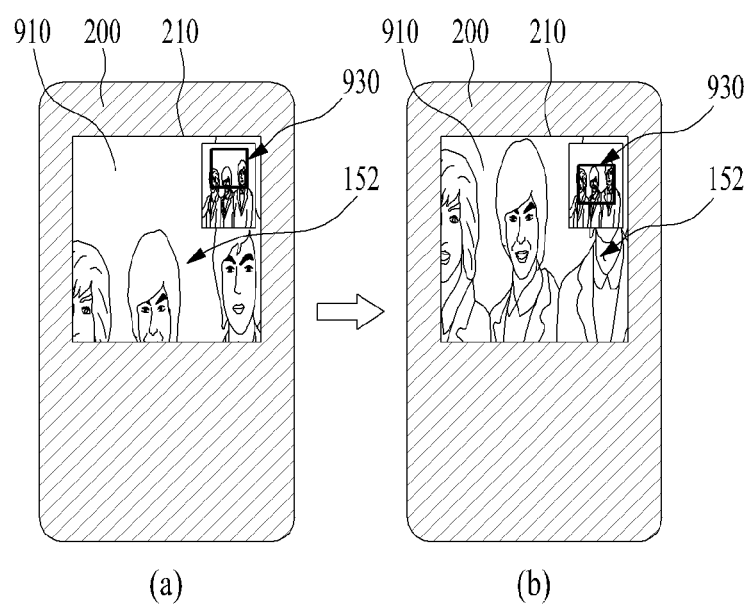
FIG. 18 is a diagram for explaining an example of using a camera in a closed state of a cover in a mobile terminal according to one embodiment of the present invention.

FIG. 18 is a diagram for explaining an example of using a camera in a closed state of a cover in a mobile terminal according to one embodiment of the present invention.

The present embodiment is explained in an assumption that the cover 200 is closed after the camera 121 is activated in the closed state of the cover 200 or the camera 121 is activated in the opened state of the cover 200.

As depicted in FIG. 18 (a), a preview image 910 obtained by the camera 121 is displayed in a specific area 152 of the display 151 corresponding to an opening part 210. The preview image 910 displayed in the specific area 152 may correspond to a part of the preview image obtained by the camera 121 or may correspond to a part of the preview image in which a display magnification has changed (e.g., magnified).

The controller 180 can control the display 151 to display an indicator 930 indicating a position of the part of the preview image 910 displayed in the specific area 152 among the whole preview image obtained by the camera 121. The indicator 930 is displayed in a manner of being overlaid on the preview image 910 and may change its position on the specific area 152 by user.

A user may change a part of the preview image 910 displayed via the specific area 152 by touching and dragging a random part of the preview image 910 displayed in the specific area 152 and may change a display magnification of the preview image 910 in a manner of randomly touching two parts of the preview image 910 displayed in the specific area 152 and dragging the two parts inside or outside.

As depicted in FIG. 18 (b), if the part of the preview image 910 displayed in the specific area 152 varies from the previous image, the controller 180 can configure the indicator 930 in a manner of reflecting the variation.

Figure 19:
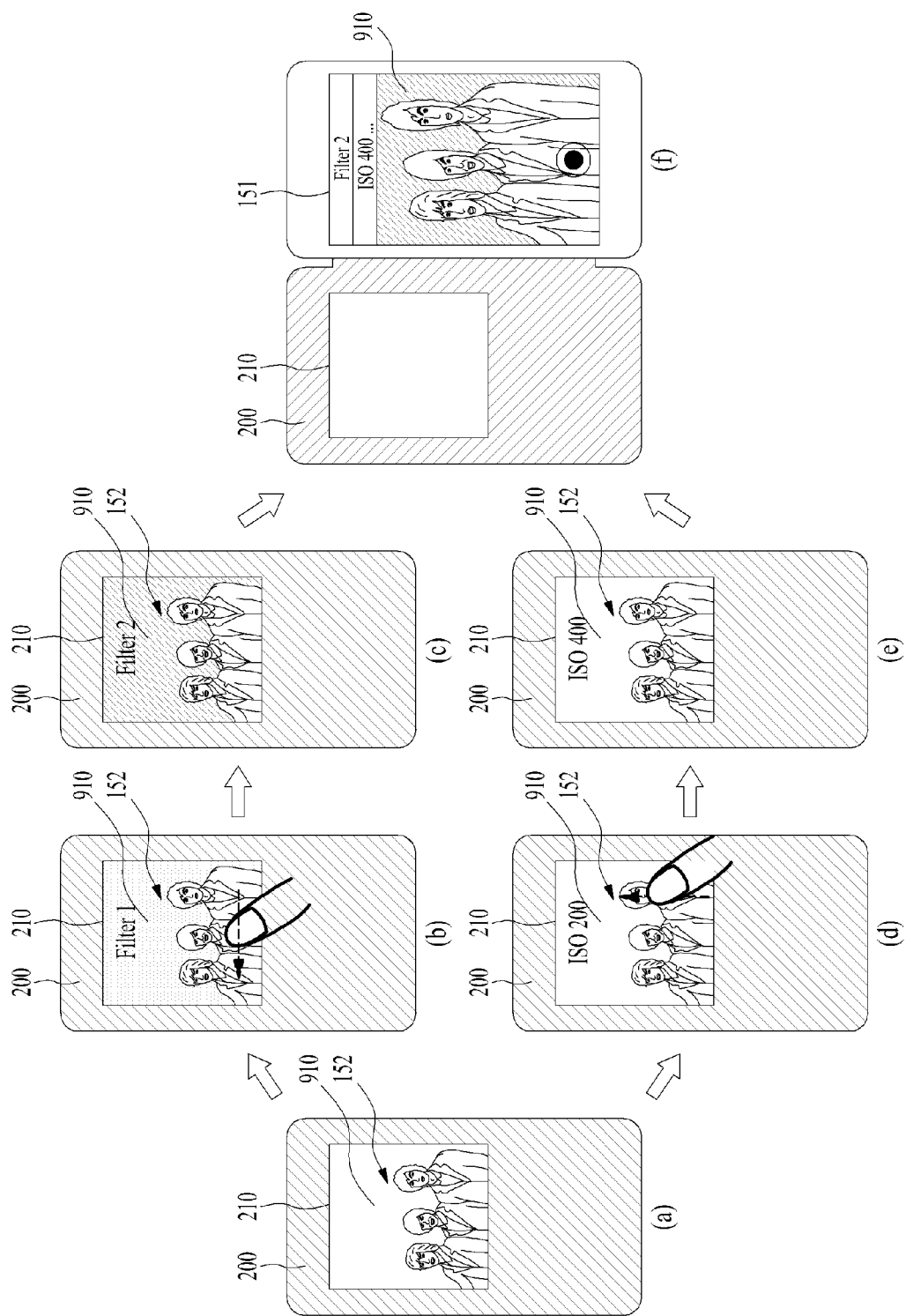
FIG. 19 is a diagram for explaining a different example of using a camera in a closed state of a cover in a mobile terminal according to one embodiment of the present invention.

FIG. 19 is a diagram for explaining a different example of using a camera in a closed state of a cover in a mobile terminal according to one embodiment of the present invention.

The present embodiment is explained in an assumption that the cover 200 is closed after the camera 121 is activated in the closed state of the cover 200 or the camera 121 is activated in the opened state of the cover 200.

As depicted in FIG. 19 (a), a preview image 910 obtained by the camera 121 is displayed in a specific area 152 of the display 151 corresponding to an opening part 210.

According to the present embodiment, an environment setting of the camera 121 may change according to a prescribed touch input touching the specific area 152 in the state that the cover 200 is closed.

As an example, as depicted in FIGS. 19 (b) and (c), if a flicking touch input touching the specific area 152 in horizontal direction is detected, the controller 180 can change a type of filter of the camera 121.

As a different example, as depicted in FIGS. 19 (d) and (e), if a flicking touch input touching the specific area 152 in vertical direction is detected, the controller 180 can change a capturing mode of the camera 121.

As depicted in FIG. 19 (e), if opening of the cover 200 is detected, the controller 180 can control the display 151 to display a detail screen for the environment setting of the camera 121.

Figure 20:
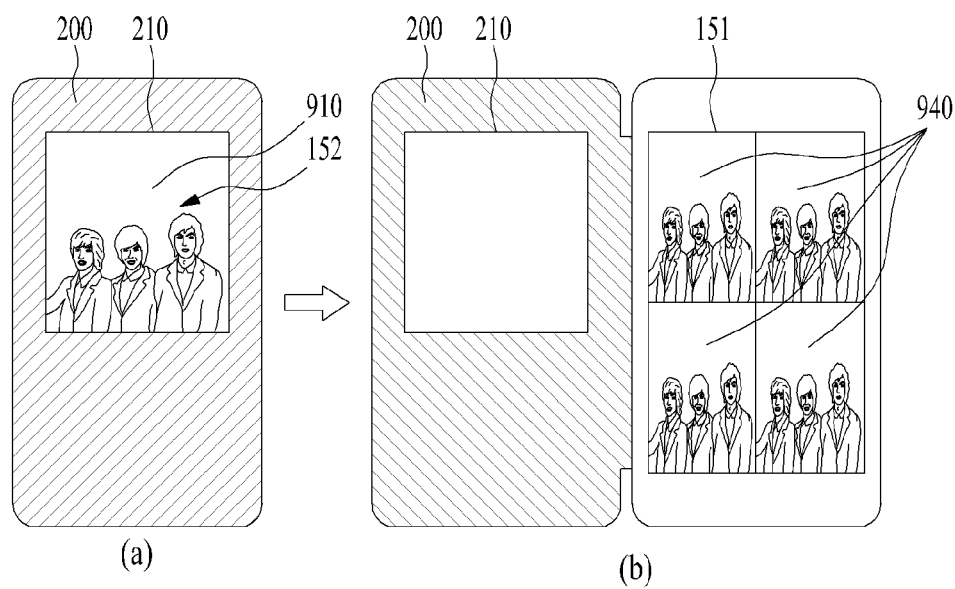
FIG. 20 is a diagram for explaining an example of a screen displayed in a display in case that a cover changes from a closed state to an opened state after a picture is captured using a camera in the closed state of the cover in a mobile terminal according to one embodiment of the present invention.

FIG. 20 is a diagram for explaining an example of a screen displayed in a display in case that a cover changes from a closed state to an opened state after a picture is captured using a camera in the closed state of the cover in a mobile terminal according to one embodiment of the present invention.

The present embodiment is explained in an assumption that the cover 200 is closed after the camera 121 is activated in the closed state of the cover 200 or the camera 121 is activated in the opened state of the cover 200.

As depicted in FIG. 20 (a), a preview image 910 obtained by the camera 121 is displayed in a specific area 152 of the display 151 corresponding to an opening part 210.

A user can take a picture in a state that the cover 200 is closed. As an example, if a volume key button is selected in a state that the preview image 910 is displayed in the specific area 152, the controller 180 captures the original of the preview image obtained by the camera 121 as it is and may be then able to store it as an image file, by which the present invention may be non-limited.

As depicted in FIG. 20 (b), if opening of the cover 200 is detected, the controller 180 can control the display 151 to display images 940, which are stored in the state that the cover 200 is closed.

According to the present embodiment, a user takes a picture using the camera 121 in the closed state of the cover 200 and may check pictures, which are taken before the cover 200 is opened only, by opening the cover 200.

Meanwhile, according to the present invention, the controller may enter a memo mode in the state that the cover 200 is closed. Regarding this, it is explained with reference to FIG. 21 and FIG. 22.

Figure 21:
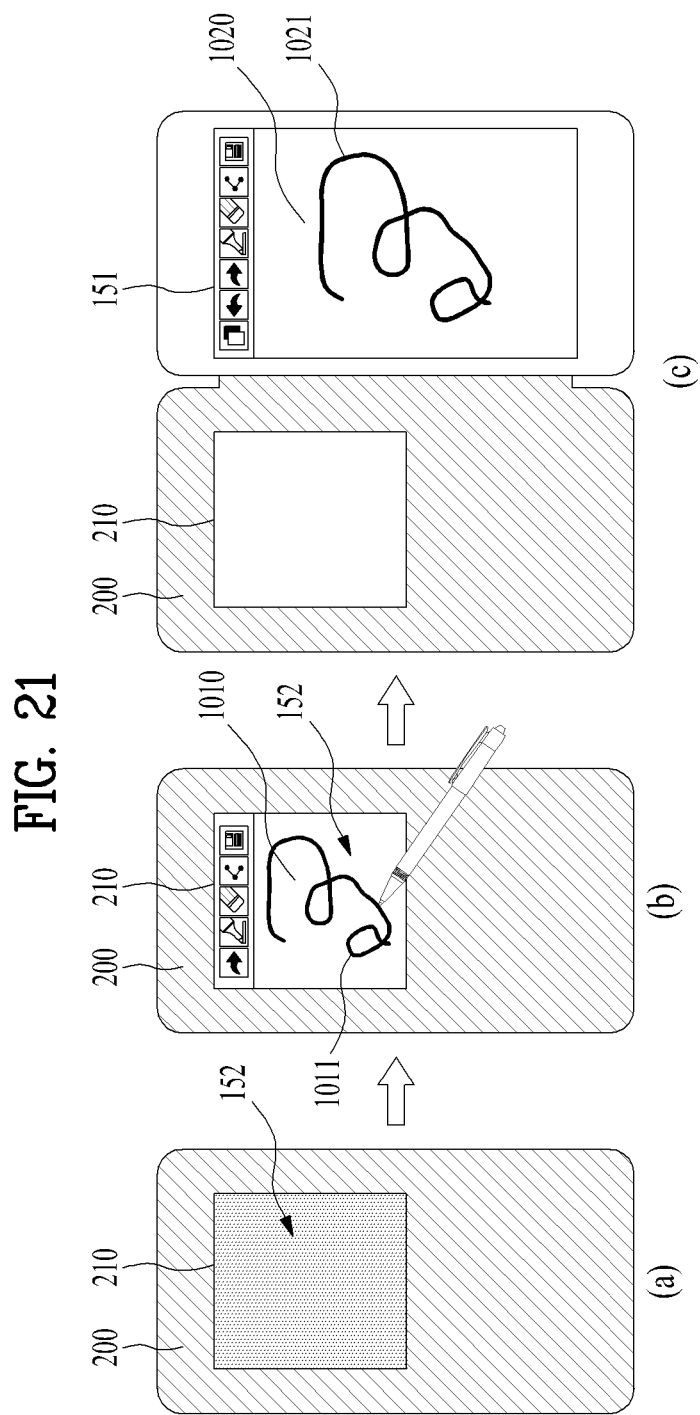
FIG. 21 is a diagram for explaining an example of using a memo application in a closed state of a cover in a mobile terminal according to one embodiment of the present invention.

FIG. 21 is a diagram for explaining an example of using a memo application in a closed state of a cover in a mobile terminal according to one embodiment of the present invention.

As depicted in FIG. 21 (a), the cover 200 includes an opening part 210 and a specific area 152 of the display 151 is exposes via the opening part 210 in the state that the cover 200 is closed.

As depicted in FIG. 21 (b), if a predetermined user input is detected in the state that the cover 200 is closed, the controller 180 enters a memo mode and controls the display 151 to display an execution screen 1010 of the memo mode in the specific area 152. The execution screen 1010 of the memo mode displayed in the specific area 152 may correspond to a screen in which a display state has changed to make an execution screen 1020 of the memo mode, which is to be displayed in a whole screen of the display 151 in the opened state of the cover 200, correspond to a position and a size of the opening part 210. As an example, the execution screen 1010 of the memo mode in which the display state has changed may include at least one of resizing the execution screen 1020 of the memo mode to be displayed in the whole screen of the display 151, changing a position, and changing on whether to display a component object.

The predetermined user input may correspond to continuously pushing a home button 131 or a volume key button for more than a predetermined time or simultaneously pushing the home button 131 and the volume key button, by which the present invention may be non-limited.

The controller 180 detects a touch input and controls the display 151 to display a trajectory 1011 of the touch input in the specific area 152.

As depicted in FIG. 21 (c), if opening of the cover 200 is detected, the controller 180 controls the display 151 to display the execution screen 1020 corresponding to the memo mode. And, the controller 180 controls the display 151 to display a trajectory 101 of the touch input, which has been resized to correspond to the whole screen of the display 151.

Figure 22:
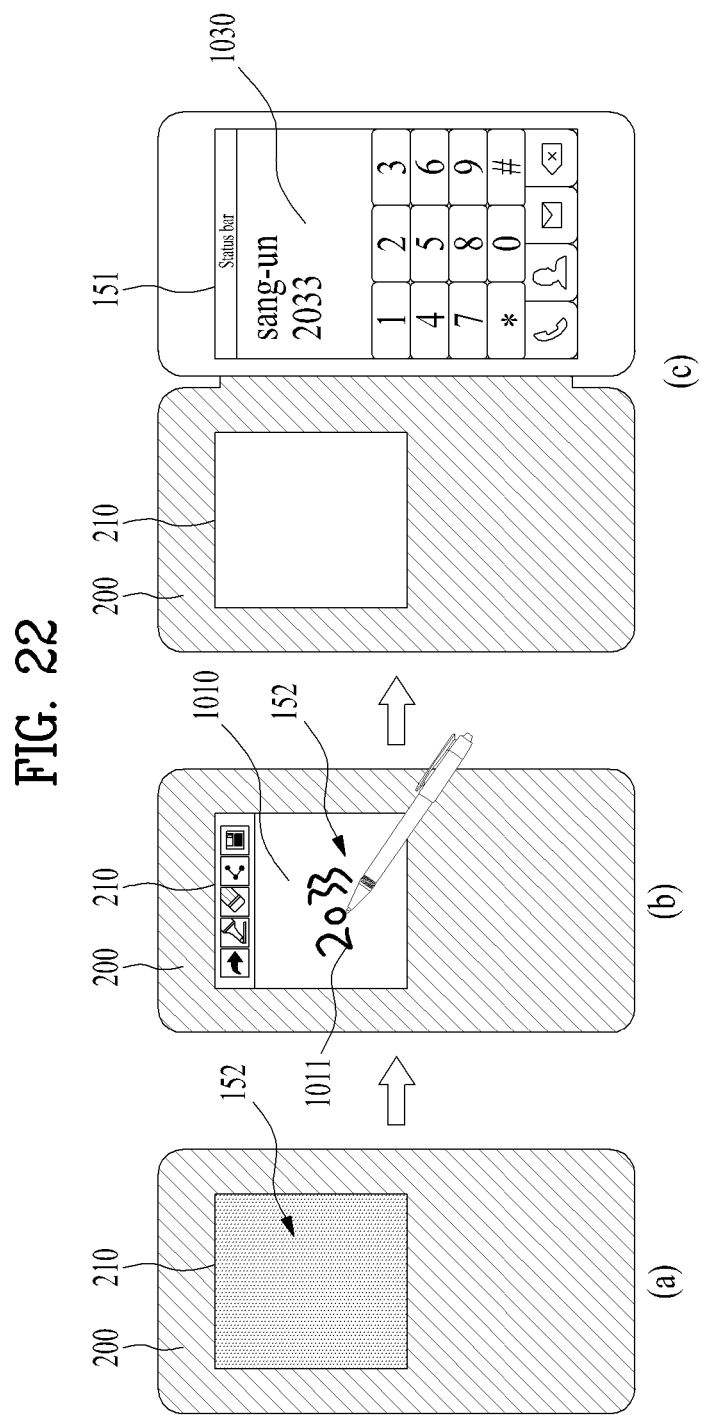
FIG. 22 is a diagram for explaining a different example of using a memo application in a closed state of a cover in a mobile terminal according to one embodiment of the present invention.

FIG. 22 is a diagram for explaining a different example of using a memo application in a closed state of a cover in a mobile terminal according to one embodiment of the present invention.

As depicted in FIG. 22 (a), the cover 200 includes an opening part 210 and a specific area 152 of the display 151 is exposed via the opening part 210 in a state that the cover 200 is closed.

As depicted in FIG. 22 (b), if a predetermined user input is detected in the state that the cover 200 is closed, the controller 180 enters a memo mode and controls the display 151 to display an execution screen 1010 of the memo mode in the specific area 152. The execution screen 1010 of the memo mode displayed in the specific area 152 may correspond to a screen in which a display state has changed to make an execution screen 1020 of the memo mode, which is to be displayed in a whole screen of the display 151 in the opened state of the cover 200, correspond to a position and a size of the opening part 210. As an example, the execution screen 1010 of the memo mode in which the display state has changed may include at least one of resizing the execution screen 1020 of the memo mode to be displayed in the whole screen of the display 151, changing a position, and changing on whether to display a component object.

The predetermined user input may correspond to continuously pushing a home button 131 or a volume key button for more than a predetermined time or simultaneously pushing the home button 131 and the volume key button, by which the present invention may be non-limited.

The controller 180 detects a touch input and controls the display 151 to display a trajectory 1011 of the touch input in the specific area 152. And, the controller 180 recognizes whether the trajectory 1011 of the touch input corresponds to a prescribed character or a number. The memory 160 may preferentially store a program capable of recognizing the trajectory 1011 of the touch input and textualizing the trajectory of the touch input into a prescribed character or a number.

As depicted in FIG. 22 (c), if opening of the cover 200 is detected, the controller 180 executes a second application and controls the display 151 to display an execution screen 1030 of the second application. The second application is an application scheduled to be executed when the opening of the cover 200 is detected in case that the trajectory 100 of the touch input corresponds to a prescribed character or a number. As an example, the second application may correspond to a telephone application or a contact application.

The controller 180 controls the display 151 to display the recognized character or the number in a specific field of the execution screen 1030 of the second application.

As an example, the recognized character may correspond to a name corresponding to a contact stored in a telephone directory and the recognized number may correspond to a telephone number stored in the telephone directory or a speed dial.

According to the present embodiment, a user can memo a name or a telephone number of a person with which the user intends to make a call or a name or a telephone number of a person for which the user intends to search by activating the memo mode in the state that the cover 200 is closed. Hence, the user may attempt to directly make a call with a corresponding person by pushing a call button when the second application is executed as a result of opening the cover 200.

Meanwhile, according to the present invention, it may enter a text message mode in the state that the cover 200 is closed due to occurrence of an external event. Regarding this, it is explained with reference to FIG. 23 to FIG. 27. As an example, the external event may correspond to reception of a new text message.

Figure 23:
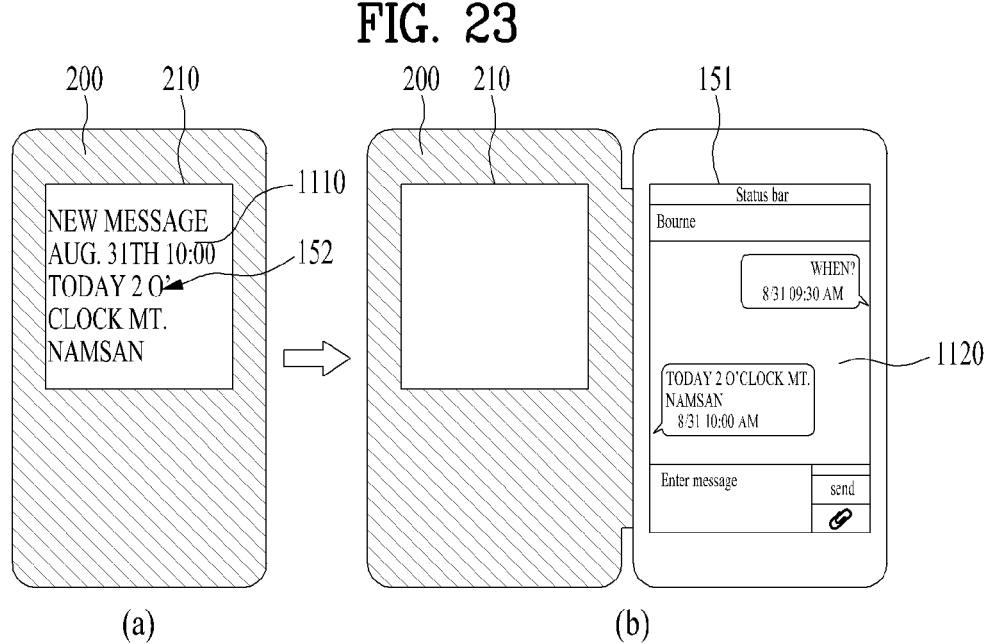
FIG. 23 is a diagram for explaining an example of using a text application in a closed state of a cover in a mobile terminal according to one embodiment of the present invention.

FIG. 23 is a diagram for explaining an example of using a text application in a closed state of a cover in a mobile terminal according to one embodiment of the present invention.

As depicted in FIG. 23 (a), the cover 200 includes an opening part 210 and a specific area 152 of the display 151 is exposed via the opening part 210 in a state that the cover 200 is closed.

If reception of a new text message is detected, the controller 180 enters a message mode and controls the display 151 to display an execution screen 1110 of the message mode in the specific area 152. As an example, the execution screen 1110 of the message mode displayed in the specific area 152 may include at least a part of the received content of the new text message.

As depicted in FIG. 23 (b), if opening of the cover 200 is detected, the controller 180 controls the display 151 to display an execution screen 1120 of the message mode. The execution screen 1120 of the message mode displayed in a whole screen of the display 151 may include detail content of the new text message and at least a part of the content of text messages which are received before the new text message is received.

Figure 24:
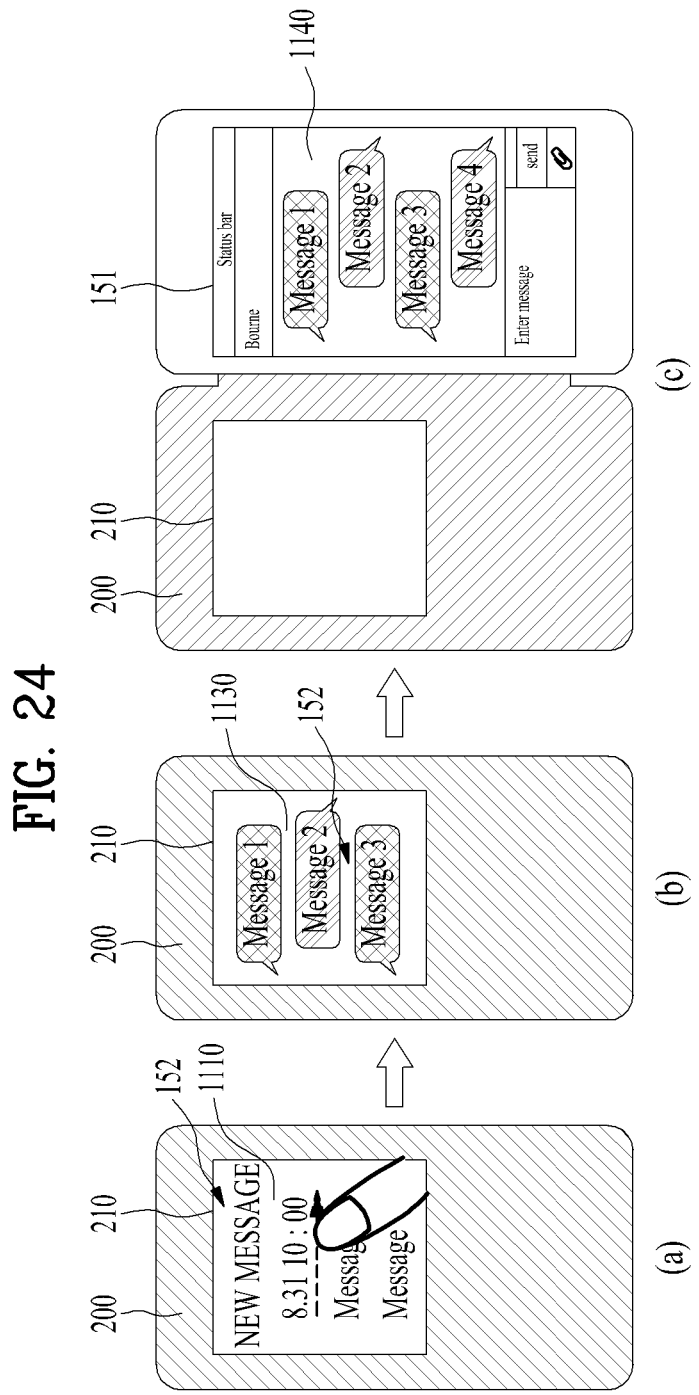
FIG. 24 is a diagram for explaining a different example of using a text application in a closed state of a cover in a mobile terminal according to one embodiment of the present invention.

FIG. 24 is a diagram for explaining a different example of using a text application in a closed state of a cover in a mobile terminal according to one embodiment of the present invention.

As depicted in FIG. 24 (a), the cover 200 includes an opening part 210 and a specific area 152 of the display 151 is exposed via the opening part 210 in a state that the cover 200 is closed.

If reception of a new text message is detected, the controller 180 enters a message mode and controls the display 151 to display a first execution screen 1110 of the message mode in the specific area 152. As an example, the first execution screen 1110 of the message mode displayed in the specific area 152 may include at least a part of the received content of the new text message.

As depicted in FIG. 24 (*b*), if a predetermined user input is detected, the controller 180 controls the display 151 to display a second execution screen 1130 of the message mode including text messages, which are transceived with a sender of the received new text message, in the specific area 152.

The predetermined user input may correspond to a flicking touch input touching the specific area 152 in horizontal direction, by which the present invention may be non-limited. The second execution screen 1130 of the message mode displayed in the specific area 152 may correspond to a screen in which a display state has changed to make a third execution screen 1140 of the message mode, which is to be displayed in a whole screen of the display 151 in the state that the cover 200 is opened, correspond to a position and a size of the opening part 210. As an example, the second execution screen 1130 of the message mode in which the display state has changed may include at least one of resizing the third execution screen 1140 of the message mode to be displayed in the whole screen of the display 151, changing a position, and changing on whether to display a component object.

As depicted in FIG. 24 (*c*), if opening of the cover 200 is detected, the controller 180 controls the display 151 to display the third execution screen 1140 of the message mode. The third execution screen 1140 of the message mode displayed in the whole screen of the display 151 may include detail content of the new text message and at least a part of the content of text messages which are received before the new text message is received.

Figure 25:
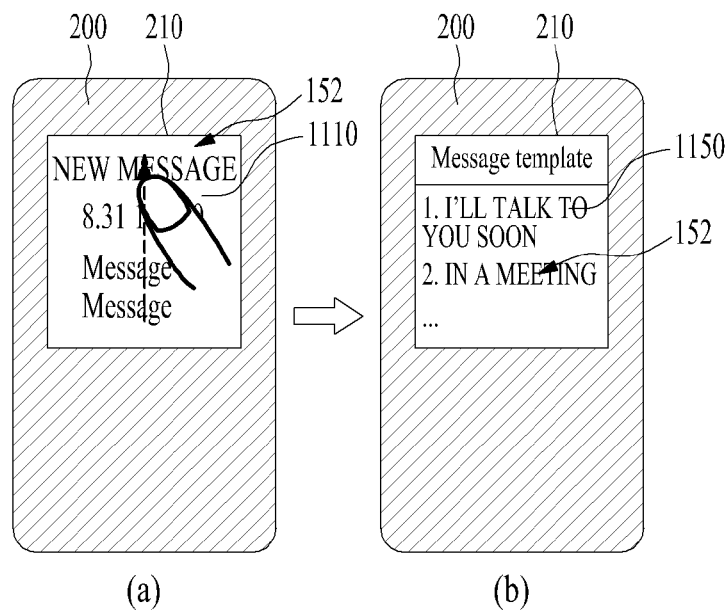
FIG. 25 is a diagram for explaining a further different example of using a text application in a closed state of a cover in a mobile terminal according to one embodiment of the present invention.

FIG. 25 is a diagram for explaining a further different example of using a text application in a closed state of a cover in a mobile terminal according to one embodiment of the present invention.

As depicted in FIG. 25 (*a*), the cover 200 includes an opening part 210 and a specific area 152 of the display 151 is exposed via the opening part 210 in a state that the cover 200 is closed.

If reception of a new text message is detected, the controller 180 enters a message mode and controls the display 151 to display an execution screen 1110 of the message mode in the specific area 152. As an example, the execution screen 1110 of the message mode displayed in the specific area 152 may include at least a part of the received content of the new text message.

As depicted in FIG. 25 (*b*), if a first user input is detected, the controller 180 controls the display 151 to display a guide message list 1150 for asking for understanding of a sender of the new text message in the specific area 152.

The first user input may correspond to a flicking touch input touching the specific area 152 in vertical direction, by which the present invention may be non-limited.

If a second user input for selecting one of guide messages included in the guide message list 1150 is detected, the controller 180 may control a mobile communication module 112 to send a text message including the selected guide message to the sender.

Figure 26:
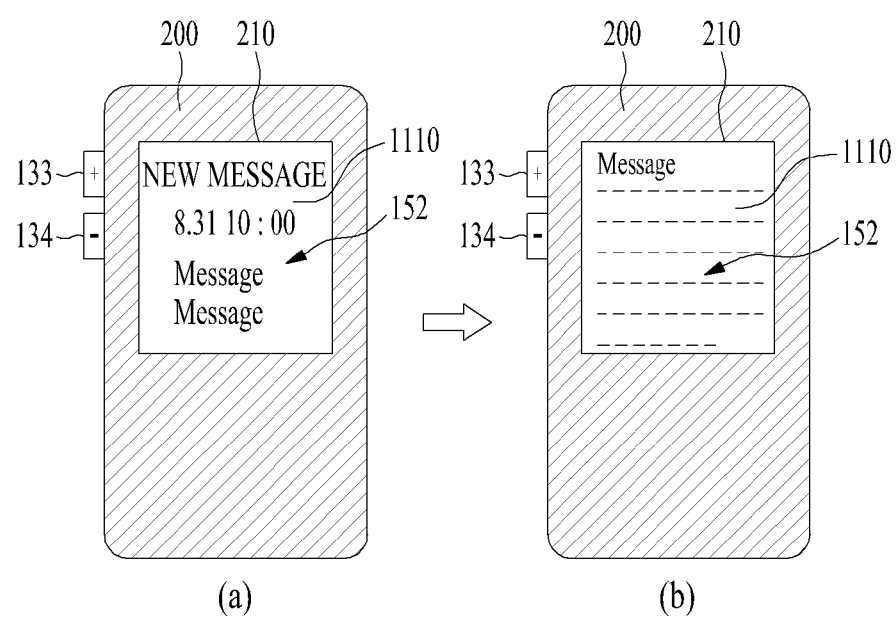
FIG. 26 is a diagram for explaining a further different example of using a text application in a closed state of a cover in a mobile terminal according to one embodiment of the present invention.

FIG. 26 is a diagram for explaining a further different example of using a text application in a closed state of a cover in a mobile terminal according to one embodiment of the present invention.

As depicted in FIG. 26 (*a*), the cover 200 includes an opening part 210 and a specific area 152 of the display 151 is exposed via the opening part 210 in a state that the cover 200 is closed.

If reception of a new text message is detected, the controller 180 enters a message mode and controls the display 151 to display an execution screen 1110 of the message mode in the specific area 152. As an example, the execution screen 1110 of the message mode displayed in the specific area 152 may include at least a part of the received content of the new text message.

As depicted in FIG. 26 (*b*), if a predetermined user input is detected, the controller 180 can control the display 151 to display content of the received new text message in a manner of scrolling the content of the received new text message.

The predetermined user input may correspond to pushing of a volume button 133/134, by which the present invention may be non-limited. For instance, if the predetermined user input corresponds to the pushing of a volume up button 133, the content of the received text message is scrolled up and if the predetermined user input corresponds to the pushing of a volume down button 134, the content of the received text message is scrolled down.

Figure 27:
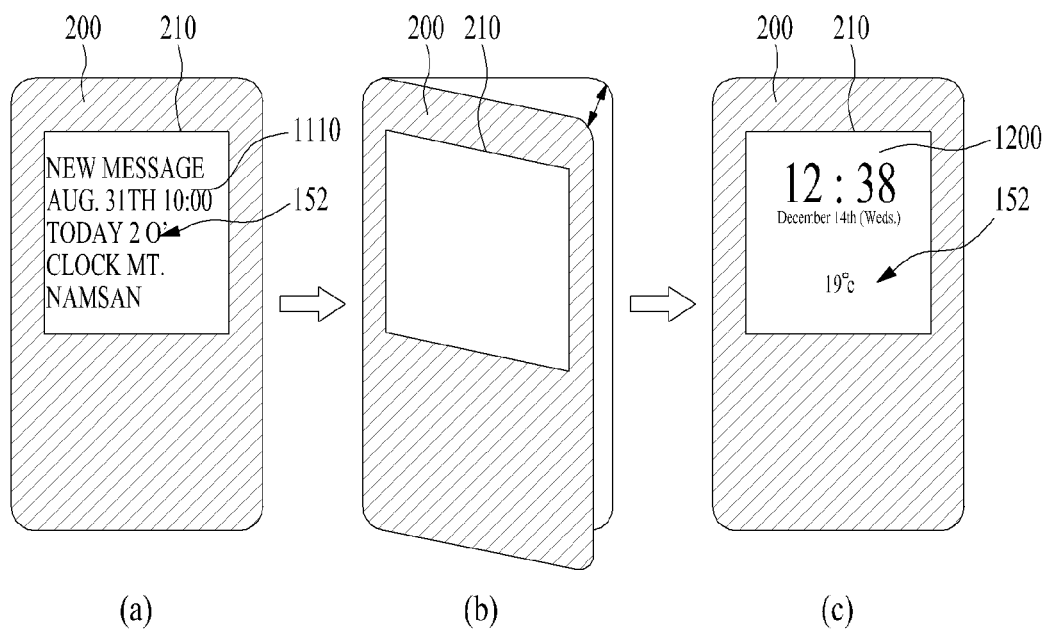
FIG. 27 is a diagram for explaining a further different example of using a text application in a closed state of a cover in a mobile terminal according to one embodiment of the present invention.

FIG. 27 is a diagram for explaining a further different example of using a text application in a closed state of a cover in a mobile terminal according to one embodiment of the present invention.

As depicted in FIG. 27 (*a*), the cover 200 includes an opening part 210 and a specific area 152 of the display 151 is exposed via the opening part 210 in a state that the cover 200 is closed.

If reception of a new text message is detected, the controller 180 enters a message mode and controls the display 151 to display an execution screen 1110 of the message mode in the specific area 152. As an example, the execution screen 1110 of the message mode displayed in the specific area 152 may include at least a part of the received content of the new text message.

As depicted in FIG. 27 (*b*), if opening and closing of the cover 200 are detected at least once within a predetermined time, the controller 180 deletes the received new text message.

As depicted in FIG. 27 (*c*), the controller 180 can control the display 151 to display a mini home screen 1200 in the specific area 152 after the received new text message is deleted.

FIG. 28 is a diagram for explaining an example of a screen displayed in a display in case that a cover changes from a closed state to an opened state after an event occurs in the closed state of the cover in a mobile terminal according to one embodiment of the present invention.

The cover 200 includes an opening part 210 and a specific area 152 of the display 151 is exposed via the opening part 210 in a state that the cover 200 is closed.

If occurrence of an event is detected, the controller 180 controls the display 151 to display an execution screen of an application related to the occurred event in the specific area 152. As an example, the occurrence of the event may correspond to occurrence of such an internal event as schedule notification or an alarm or occurrence of such an external event as reception of a text message or a call signal.

As an example, referring to FIG. 28 (*a*), if a schedule notification is detected, the controller 180 controls the display 151 to display an execution screen 1210 related to a calendar application in the specific area 152. And, if opening of the cover 200 is detected, the controller 180 controls the display 151 to display a detail screen 1220 related to the schedule notification.

As a different example, referring to FIG. 28 (*b*), if an alarm is detected, the controller 180 controls the display 151 to display an execution screen 1230 related to an alarm application in the specific area 152. And, if opening of the cover 200 is detected, the controller 180 controls the display 151 to display a detail screen 1240 related to the alarm.

Figure 29:
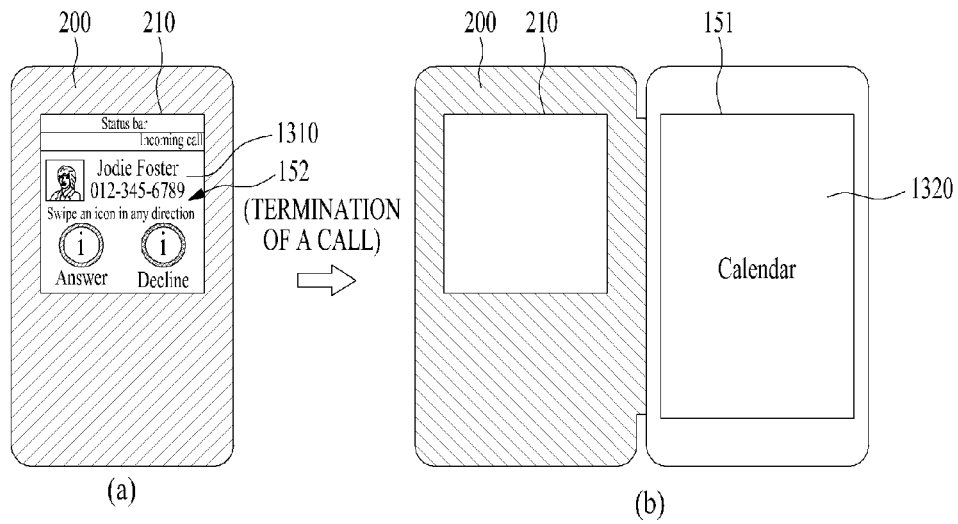
FIG. 29 is a diagram for explaining an example of a screen displayed in a display in case that a cover changes from a closed state to an opened state after a call is made in the closed state of the cover in a mobile terminal according to one embodiment of the present invention.

FIG. 29 is a diagram for explaining an example of a screen displayed in a display in case that a cover changes from a closed state to an opened state after a call is made in the closed state of the cover in a mobile terminal according to one embodiment of the present invention.

As depicted in FIG. 29 (a), the cover 200 includes an opening part 210 and a specific area 152 of the display 151 is exposed via the opening part 210 in a state that the cover 200 is closed.

If a call signal is received, the controller 180 controls the display 151 to display a screen 1310 related to reception of the call signal in the specific area 152. A user can make a call in the state that the cover 200 is closed.

The controller 180 records a telephone conversation while a call is made, stores the telephone conversation in the memory 160, and converts the telephone conversation into a text using a voice recognition function.

As depicted in FIG. 29 (b), if opening of the cover 200 is detected after the call is terminated, the controller 180 controls the display to display an execution screen 1320 of a second application related to the telephone conversation based on a result of converting the telephone conversation which is converted to the text.

For instance, if the telephone conversation relates to such a schedule as a decision on a place of promise and the like, the controller 180 can control the display 151 to display the execution screen 1320 of a calendar application based on the result of converting the telephone conversation which is converted to the text.

Figure 30:
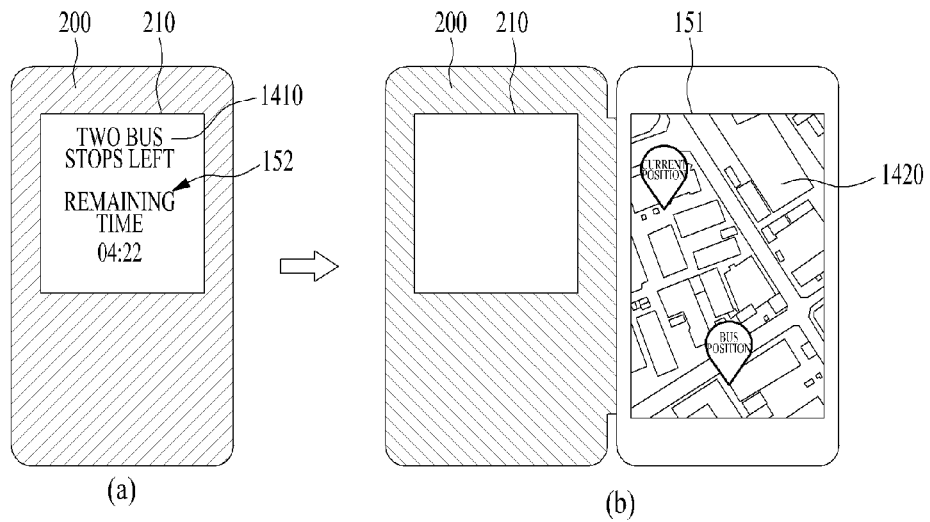
FIG. 30 is a diagram for explaining an example of executing an application utilizing location information in a closed state of a cover in a mobile terminal according to one embodiment of the present invention.

FIG. 30 is a diagram for explaining an example of executing an application utilizing location information in a closed state of a cover in a mobile terminal according to one embodiment of the present invention.

As depicted in FIG. 30 (a), the cover 200 includes an opening part 210 and a specific area 152 of the display 151 is exposed via the opening part 210 in a state that the cover 200 is closed.

The controller 180 obtains location information of the mobile terminal 100 via the position-location module 115 according to a predetermined condition and may execute a first application utilizing the obtained position information of the mobile terminal 100. And, the controller 180 controls the display 151 to display an execution screen 1410 of the first application in the specific area 152.

As an example, if the mobile terminal 100 is adjacent to a bus stop designated by a user in advance, the controller 180 obtains the location information of the mobile terminal 100 using the position-location module 115 and may be then able to execute a bus guide application utilizing the obtained location information of the mobile terminal 100. The controller 180 controls the display 151 to display an execution screen 1410 of the bus guide application in the specific area 152. The execution screen 1410 of the bus guide application may include information used for guiding an arriving time or a position of a predetermined bus.

If opening of the cover 200 is detected, the controller 180 can control the display 151 to display the execution screen of the first application or the execution screen of the second application interlocked with the first application.

As an example, if the opening of the cover 200 is detected, the controller 180 can control the display 151 to display an execution screen 1420 of a map application interlocked with the bus guide application. The execution screen 1420 of the map application may include information on a current position of the mobile terminal 100, a current position of the predetermined bus, a driving route of the predetermined bus, and the like.

Figure 31:
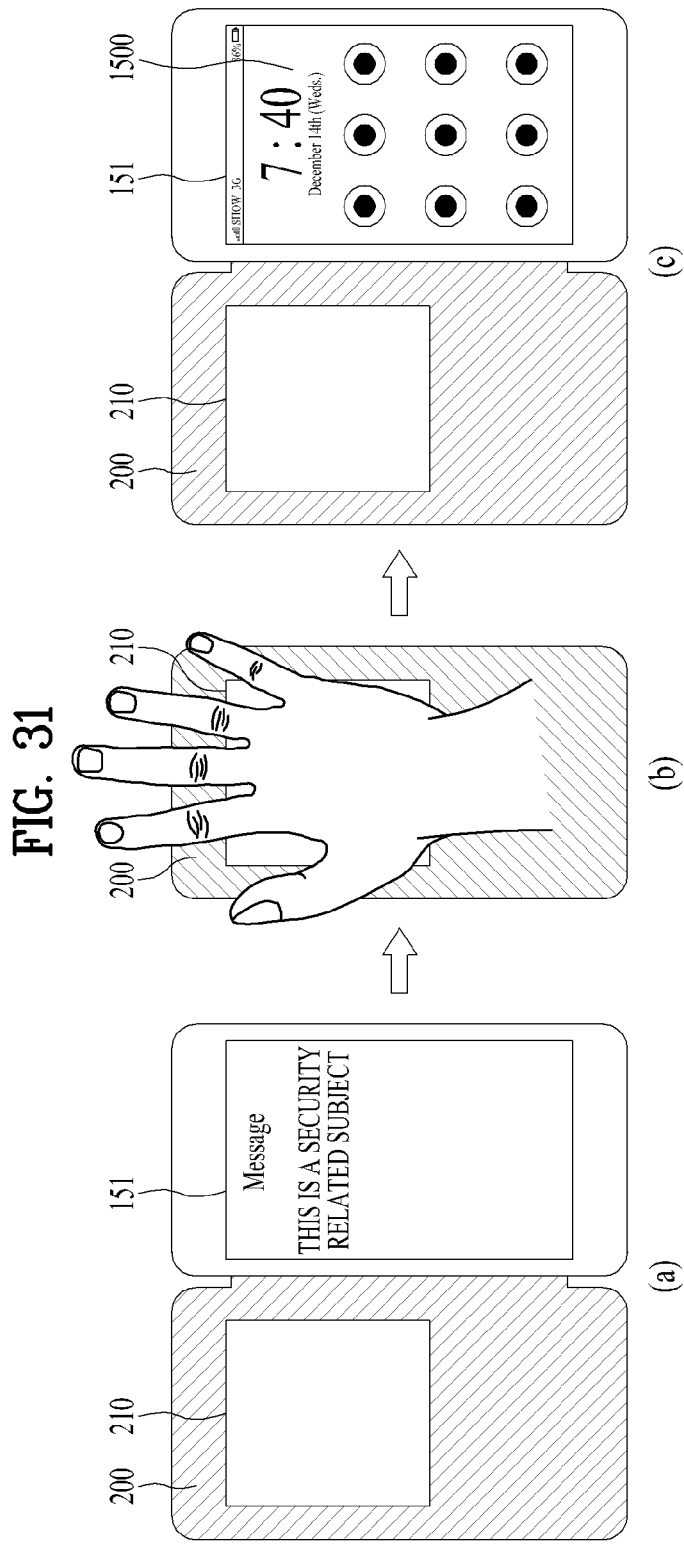
FIG. 31 is a diagram for explaining an example of a method of deleting a text message in a closed state of a cover in a mobile terminal according to one embodiment of the present invention.

FIG. 31 is a diagram for explaining an example of a method of deleting a text message in a closed state of a cover in a mobile terminal according to one embodiment of the present invention.

As depicted in FIG. 31 (a), the cover 200 includes an opening part 210 and a specific area 152 of the display 151 is exposed via the opening part 210 in a state that the cover 200 is closed.

As depicted in FIG. 31 (a), the present embodiment is explained in an assumption that a new text message is received. Although FIG. 31 (a) shows a case that content of the new text message is checked in an opened state of the cover 200, the content of the new text message can also be checked via the specific area 152 in the state that the cover 200 is closed.

As depicted in FIG. 31 (b), the controller 180 detects a proximity touch for an area greater than a predetermined amount among a total area of the specific area 152 in the state that the cover 200 is closed. If the proximity touch is maintained for a prescribed time, the controller 180 deletes the new text message.

As depicted in FIG. 31 (c), if opening of the cover 200 is detected after the new text message is deleted, the controller 180 can control the display 151 to display a lock screen 1500 or a home screen.

Figure 32:
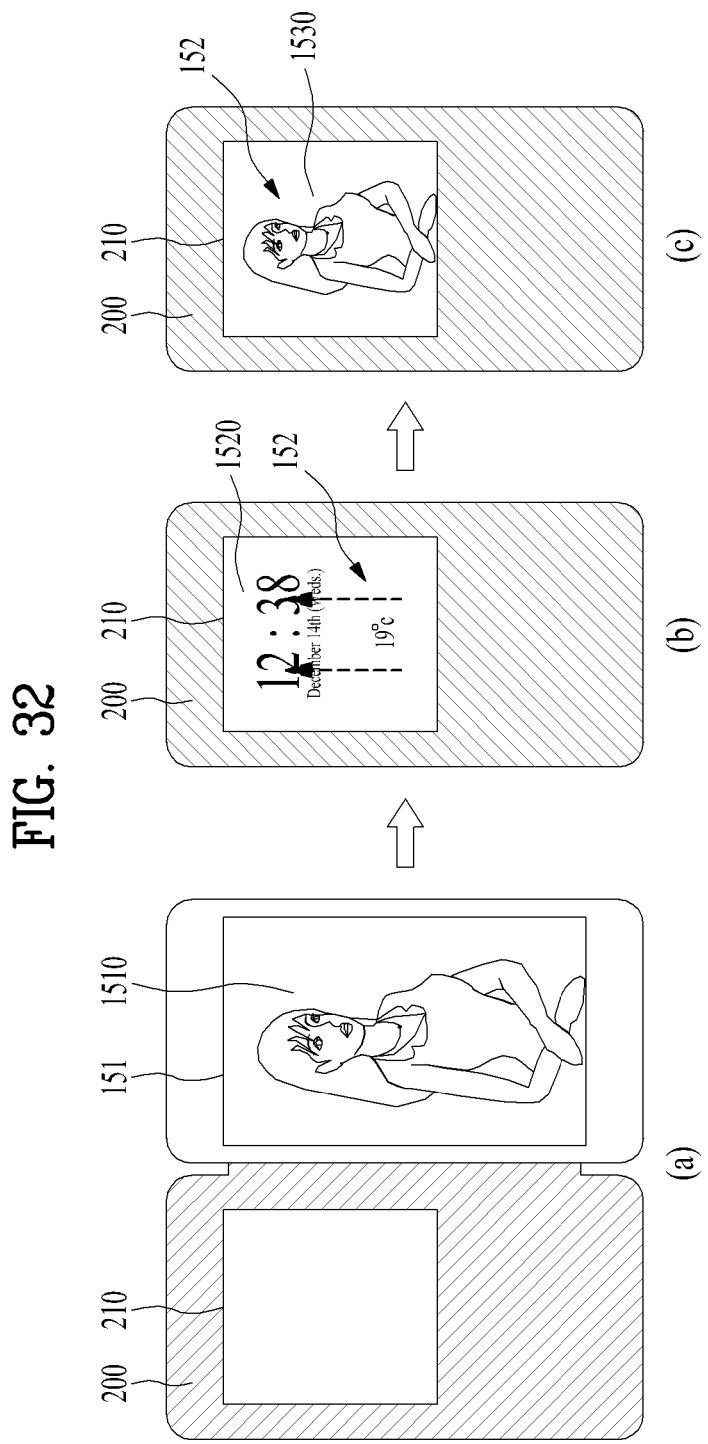
FIG. 32 is a diagram for explaining an example of a screen displayed in a display in case that a cover changes from an opened state to a closed state while a first application is executing in the opened state in a mobile terminal according to one embodiment of the present invention.

FIG. 32 is a diagram for explaining an example of a screen displayed in a display in case that a cover changes from an opened state to a closed state while a first application is executing in the opened state in a mobile terminal according to one embodiment of the present invention.

Referring to FIG. 32 (a), the first application is executing in the state that the cover 200 is opened and an execution screen 1510 of the first application is displayed in the display 151.

The cover 200 includes an opening part 210 and a specific area 152 of the display 151 is exposed via the opening part 210 in the state that the cover 200 is closed.

As depicted in FIG. 32 (b), if closing of the cover 200 is detected, the controller 180 temporarily pauses execution of the first application. In this case, the controller 180 can control the display 151 to display a mini home screen 1520 in the specific area 152.

As depicted in FIG. 32 (c), if a predetermined user input is detected in a state that the execution of the first application is temporarily paused, the controller 180 seamlessly executes the first application from the state that the first application is temporarily paused.

The controller 180 can control the display 151 to change a display state of the execution screen 1510 of the first application to make the display state of the execution screen correspond to a position and a size of the opening part 210 of the cover 200. In particular, the controller 180 controls the display 151 to change the display state of the execution screen 1510 of the first application to make the display state of the execution screen correspond to a position and a size of the specific area 152 of the display 151 that corresponds to the opening part 210. Hence, the execution screen 1530 of the first application in which the display state has changed is displayed via the display 151 exposed through the opening part 210 of the cover 200 in the state that the cover 200 is closed.

The change for the display state of the execution screen 1510 of the first application may include at least one of resizing the execution screen 1510 of the first application, changing a position, and changing on whether to display a component object.

The predetermined user input may correspond to a touch input randomly touching two parts of the specific area 152 and dragging the two parts in vertical direction, by which the present invention may be non-limited.

Figure 33:
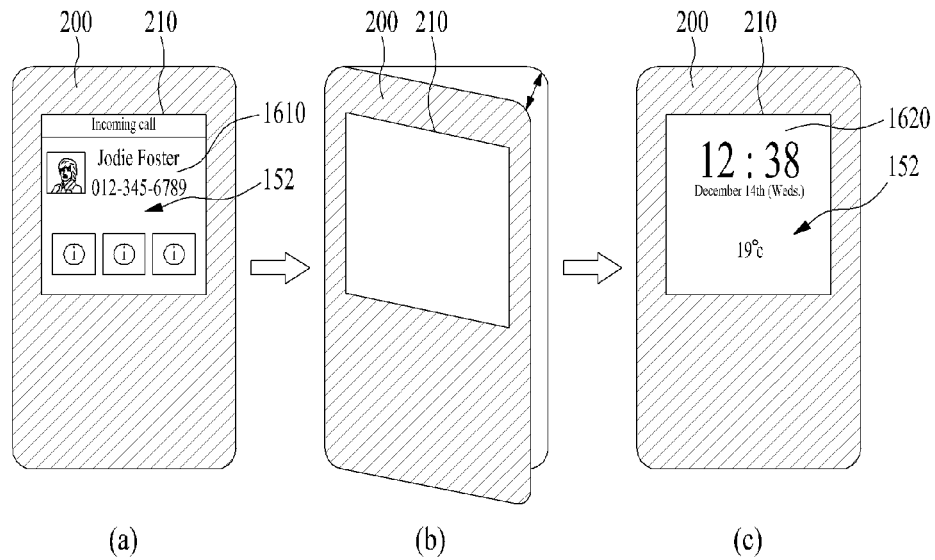
FIG. 33 is a diagram for explaining an example of a method of rejecting an event in case that an external event occurs in a closed state of a cover in a mobile terminal according to one embodiment of the present invention.

FIG. 33 is a diagram for explaining an example of a method of rejecting an event in case that an external event occurs in a closed state of a cover in a mobile terminal according to one embodiment of the present invention.

The present embodiment is explained in an assumption that occurrence of the external event corresponds to reception of a signal call.

As depicted in FIG. 33 (*a*), the cover 200 includes an opening part 210 and a specific area 152 of the display 151 is exposed via the opening part 210 in a state that the cover 200 is closed.

If a call signal is received, the controller 180 controls the display 151 to display a screen 1310 related to the reception of the call signal in the specific area 152.

As depicted in FIG. 33 (*b*), if opening and closing of the cover 200 are detected at least once within a predetermined time, the controller 180 may reject the received call signal.

The controller 180 can control the display 151 to display a mini home screen 1620 in the specific area 152 after rejecting the received call signal.

Figure 34:
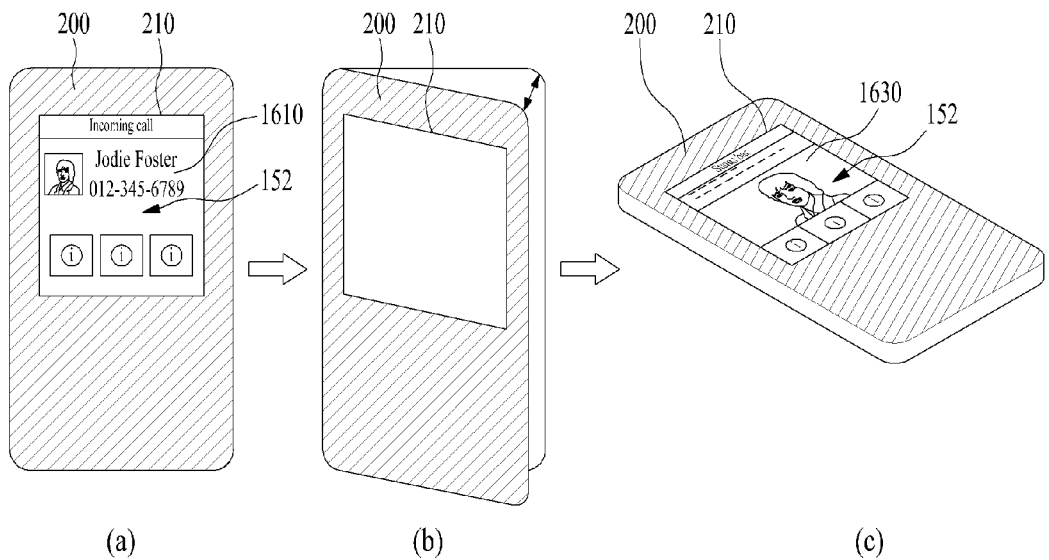
FIG. 34 is a diagram for explaining an example of a method of switching to a speaker mode in case that a call signal is received in a closed state of a cover in a mobile terminal according to one embodiment of the present invention.

FIG. 34 is a diagram for explaining an example of a method of switching to a speaker mode in case that a call signal is received in a closed state of a cover in a mobile terminal according to one embodiment of the present invention.

As depicted in FIG. 34 (*a*), the cover 200 includes an opening part 210 and a specific area 152 of the display 151 is exposed via the opening part 210 in a state that the cover 200 is closed.

If a call signal is received, the controller 180 controls the display 151 to display a screen 1310 related to the reception of the call signal in the specific area 152.

As depicted in FIG. 34 (*b*) and (*c*), if opening and closing of the cover 200 are detected at least once within a predetermined time and then a stable state of the mobile terminal is maintained for a prescribed time, the controller 180 may enter a calling mode and a speaker mode.

As an example, the stable state of the mobile terminal 100 means a state that a movement of the mobile terminal 100 is not detected. The stable state of the mobile terminal may be sensed using a gyroscope sensor, an acceleration sensor, and the like included in the sensing unit 140.

Having entered the calling mode and the speaker mode, the controller 180 can control the display 151 to display a screen 1630 corresponding to the calling mode and the speaker mode in the specific area 152.

Meanwhile, according to the present invention, it may provide a status bar function to notify a current state of the mobile terminal 100 or occurrence of an event in the state that the cover 200 is closed. Regarding this, it is explained with reference to FIG. 35 to FIG. 37.

Figure 35:
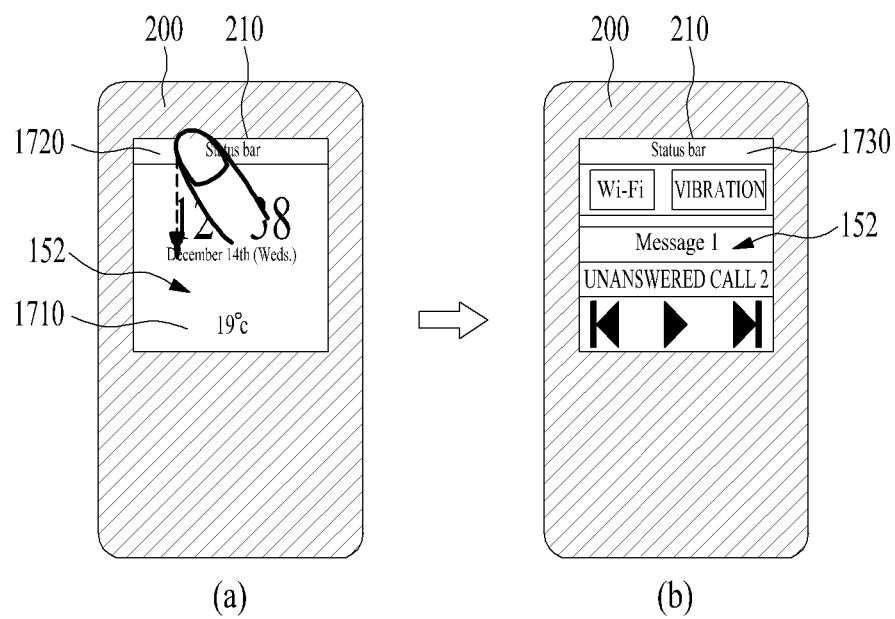
FIG. 35 is a diagram for explaining an example of a method of utilizing a function of a status bar in a closed state of a cover in a mobile terminal according to one embodiment of the present invention.

FIG. 35 is a diagram for explaining an example of a method of utilizing a function of a status bar in a closed state of a cover in a mobile terminal according to one embodiment of the present invention.

As depicted in FIG. 35 (*a*), the cover 200 includes an opening part 210 and a specific area 152 of the display 151 is exposed via the opening part 210 in a state that the cover 200 is closed.

The controller 180 controls the display 151 to display a mini home screen 1710 in the specific area 152 in the state that cover 200 is closed. A status bar 1720 used for notifying a current state of the mobile terminal 100 or occurrence of an event can be positioned at the top of the specific area 152. For instance, information on a current battery condition of the mobile terminal 100, current time, receiving a call signal in absence, occurrence of a new text message, and the like can be displayed in the status bar 1720.

A user can check detail information by an operation of touching and lowering the status bar 1720. In particular, as depicted in FIG. 35 (*b*), if a user input of touching and dragging down the status bar 1720 is detected, the controller 180 can control the display 151 to display a detail screen 1730 of the status bar in the specific area 152.

Figure 36:
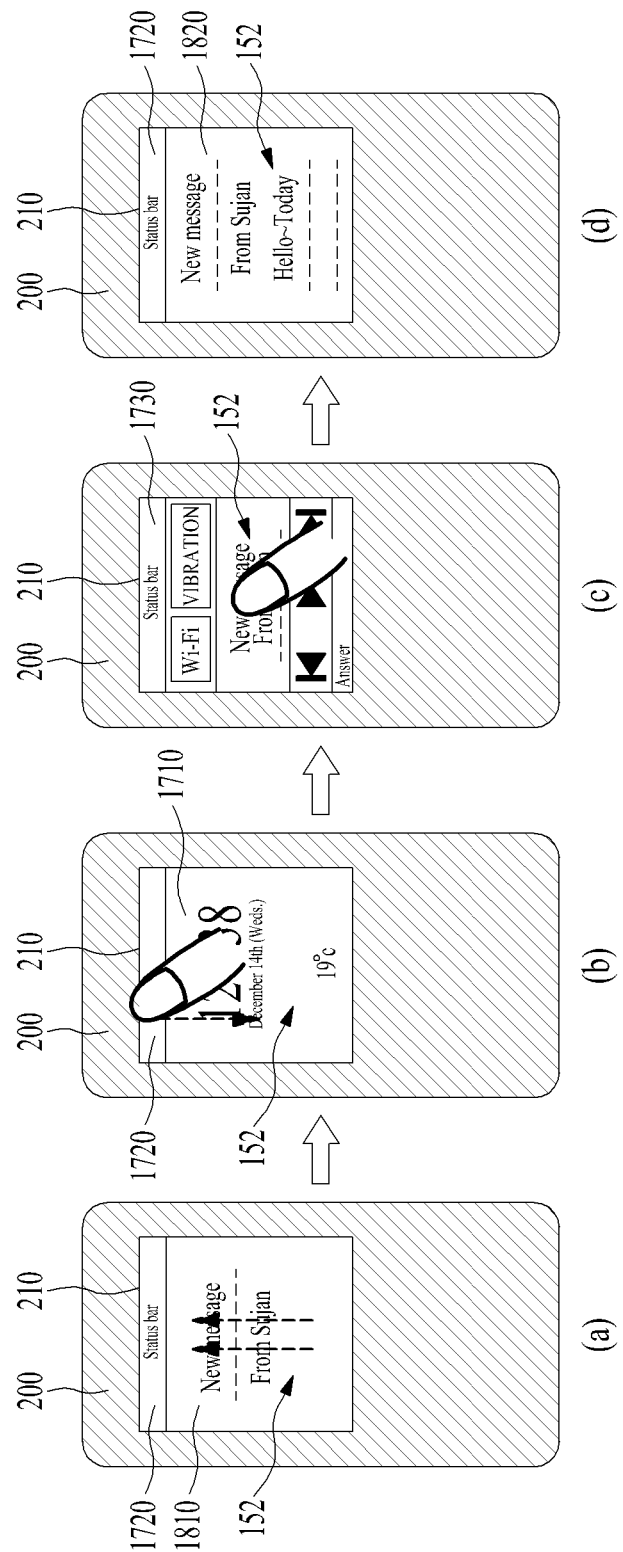
FIG. 36 is a diagram for explaining a different example of a method of utilizing a function of a status bar in a closed state of a cover in a mobile terminal according to one embodiment of the present invention.

FIG. 36 is a diagram for explaining a different example of a method of utilizing a function of a status bar in a closed state of a cover in a mobile terminal according to one embodiment of the present invention.

As depicted in FIG. 36 (*a*), the cover 200 includes an opening part 210 and a specific area 152 of the display 151 is exposed via the opening part 210 in a state that the cover 200 is closed.

If occurrence of an event is detected in the state that the cover 200 is closed, the controller 180 controls the display 151 to display an execution screen 1810 corresponding to the occurred event in the specific area 152. The present embodiment is explained in an assumption that the occurrence of the event corresponds to reception of a new text message and the execution screen 1810 of a message application is displayed in the specific area 152.

A status bar 1720 used for notifying a current state of the mobile terminal 100 or occurrence of an event can be positioned at the top of the specific area 152. For instance, information on a current battery condition of the mobile terminal 100, current time, receiving a call signal in absence, occurrence of a new text message, and the like can be displayed in the status bar 1720.

If a user wants to check content of a newly occurred event later, the user can store the occurred event in the status bar 1720. In particular, if a predetermined user input is detected, the controller 180 can store a newly received text message in the memory 160 in a manner of mapping the message to the status bar 1720. As an example, the predetermined user input may correspond to a touch input randomly touching two parts of the specific area 152 and dragging the two parts in upper direction, by which the present invention may be non-limited.

As depicted in FIG. 36 (*b*), a user can check detail information by an operation of touching and lowering the status bar 1720.

As depicted in FIG. 36 (*c*), if a user input of touching and dragging down the status bar 1720 is detected, the controller 180 can control the display 151 to display a detail screen 1730 of the status bar in the specific area 152.

Information on the text message, which is stored in a manner of being mapped to the status bar 1720, can be displayed in the detail screen 1730 of the status bar.

As depicted in FIG. 36 (*d*), if a user input for selecting the information on the text message displayed in the detail screen of the status bar is detected, the controller 180 can control the display 151 to display a screen 1820 including detail content of the text message in the specific area 152.

Figure 37:
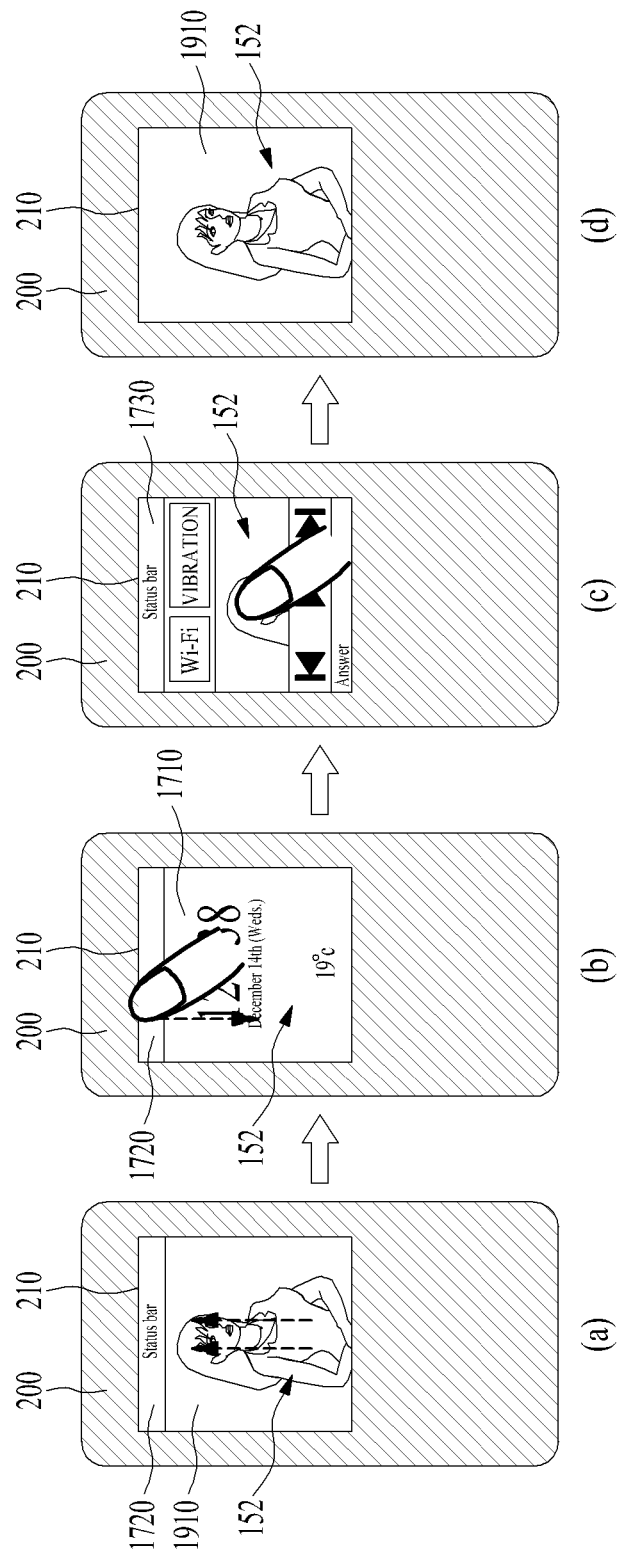
FIG. 37 is a diagram for explaining a further different example of a method of utilizing a function of a status bar in a closed state of a cover in a mobile terminal according to one embodiment of the present invention.

FIG. 37 is a diagram for explaining a further different example of a method of utilizing a function of a status bar in a closed state of a cover in a mobile terminal according to one embodiment of the present invention.

As depicted in FIG. 37 (a), the cover 200 includes an opening part 210 and a specific area 152 of the display 151 is exposed via the opening part 210 in a state that the cover 200 is closed.

If a first application is executing in the state that the cover 200 is closed, the controller 180 controls the display 151 to display an execution screen 1910 of the first application in the specific area 152. The present embodiment is explained in an assumption that the first application corresponds to a video playback application.

A status bar 1720 used for notifying a current state of the mobile terminal 100 or occurrence of an event can be positioned at the top of the specific area 152. For instance, information on a current battery condition of the mobile terminal 100, current time, receiving a call signal in absence, occurrence of a new text message, and the like can be displayed in the status bar 1720.

A user temporarily pauses execution of the first application and can store status information of the first application in the status bar 1720 when the execution of the first application is temporarily paused. In particular, the controller 180 may temporarily pause the execution of the first application and can store the status information of the first application, which is temporarily paused, in the memory 160 in a manner of mapping the status information to the status bar 1720. As an example, the predetermined user input may correspond to a touch input randomly touching two parts of the specific area 152 and dragging the two parts in upper direction, by which the present invention may be non-limited.

As depicted in FIG. 37 (b), a user can check detail information by an operation of touching and lowering the status bar 1720.

As depicted in FIG. 37 (c), if a user input of touching and dragging down the status bar 1720 is detected, the controller 180 can control the display 151 to display a detail screen 1730 of the status bar in the specific area 152.

The status information of the first application, which is stored in a manner of being mapped to the status bar 1720, can be displayed in the detail screen 1730 of the status bar.

As depicted in FIG. 37 (d), if a user input for selecting the status information of the first application displayed in the detail screen 1730 of the status bar is detected, the controller 180 seamlessly executes the first application from the state that the first application is temporarily paused and controls the display 151 to display an execution screen 1910 of the first application in the specific area 152.

Meanwhile, the mobile terminal 100 according to one embodiment of the present invention may be interlocked with a different external device. Regarding this, it is explained with reference to FIG. 38 and FIG. 39.

Figure 38:
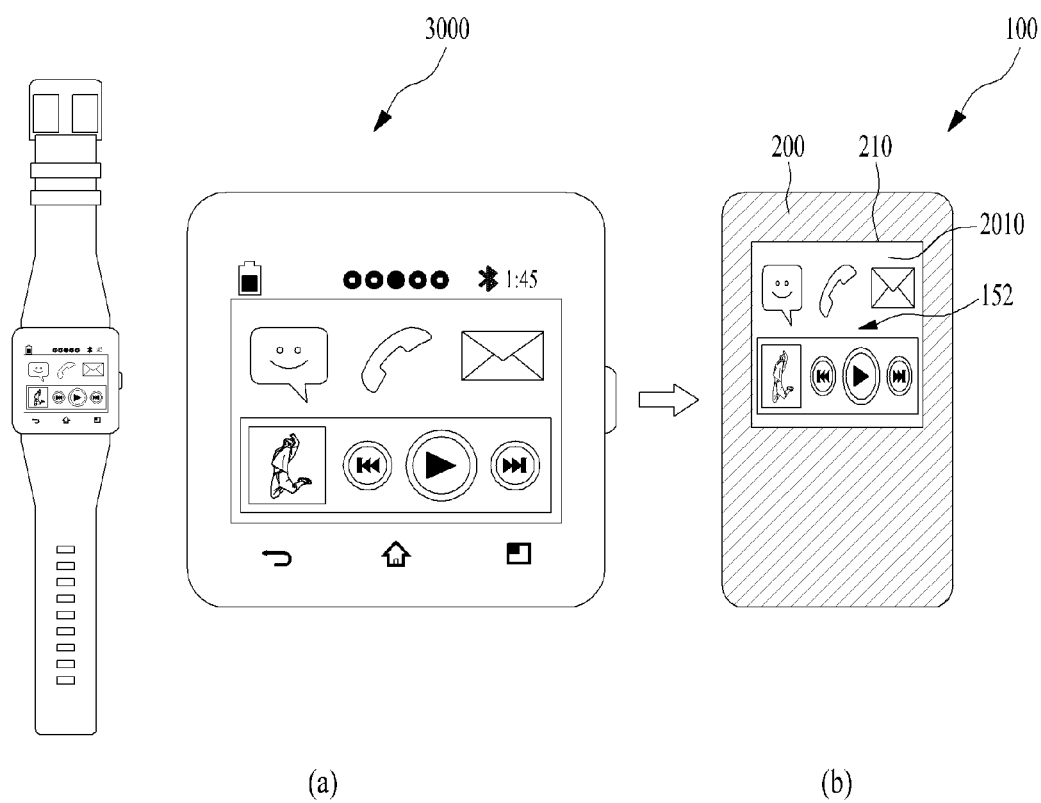
FIG. 38 is a diagram for explaining an example of a case of interworking between an external device and a mobile terminal according to one embodiment of the present invention.

FIG. 38 is a diagram for explaining an example of a case of interworking between an external device and a mobile terminal according to one embodiment of the present invention.

The present embodiment is explained with an example of a smart watch 3000 as an external device interlocked with the mobile terminal 100.

If the mobile terminal 100 is paired with the smart watch 3000 by a short-range communication method such as Bluetooth, a user may control the smart watch 3000 using the mobile terminal 100 or the user may control the mobile terminal 100 using the smart watch 3000.

The controller 180 configures a GUI using data received from the smart watch 3000 via the short-range communication module 114 and can control the display 151 to display the configured GUI in the specific area 152 of the display 151 corresponding to the opening part 210.

Figure 39:
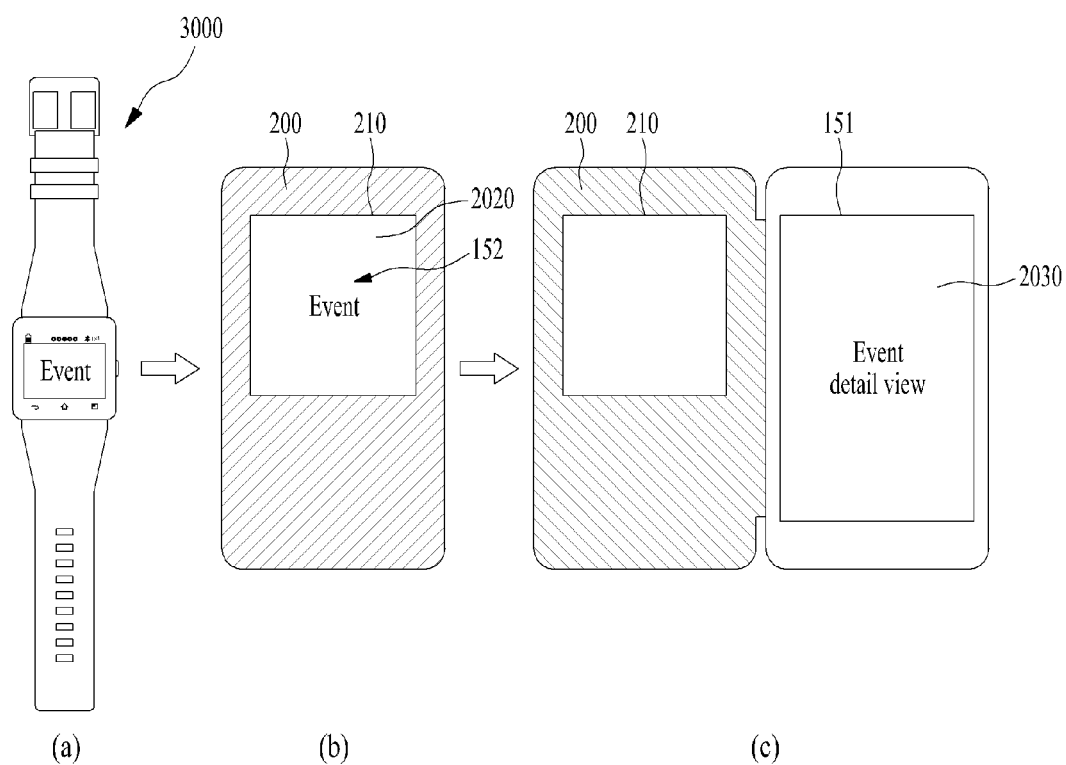
FIG. 39 is a diagram for explaining a different example of a case of interworking between an external device and a mobile terminal according to one embodiment of the present invention.

FIG. 39 is a diagram for explaining a different example of a case of interworking between an external device and a mobile terminal according to one embodiment of the present invention.

If an external event occurs in the smart watch 3000, as depicted in FIG. 39 (b), the controller 180 receives data related to the event from the smart watch 3000 via the short-range communication module 114 and can control the display 151 to display an execution screen 2020 related to the event in the specific area 152 using the received data.

If opening of the cover 200 is detected, the controller 180 can control the display 151 to display a detail screen of the event.

Accordingly, the present specification is directed to an apparatus and method thereof that substantially obviate one or more problems due to limitations and disadvantages of the related art.

According to one embodiment of the present invention, a mobile terminal provides a solution capable of utilizing various functions via a display, which is exposed through an opening part installed in a cover, in a state that the cover is closed.

According to one embodiment of the present invention, since a mobile terminal provides functional continuity of a function currently executing when a cover is opened and closed, user convenience can be enhanced.

Effects obtainable from the present invention may be non-limited by the above mentioned effect. And, other unmentioned effects can be clearly understood from the following description by those having ordinary skill in the technical field to which the present invention pertains.

It will be apparent to those skilled in the art that the present invention can be specified into other form(s) without departing from the spirit or scope of the inventions.

The above-described methods can be implemented in a program recorded medium as computer-readable codes. The computer-readable media include all kinds of recording devices in which data readable by a computer system are stored. The computer-readable media include ROM, RAM, CD-ROM, magnetic tapes, floppy discs, optical data storage devices, and the like for example and also include carrier-wave type implementations (e.g., transmission via Internet). And, the computer can include the control unit 180 of the terminal.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A mobile terminal, comprising:
   a housing;
   a display;
   a cover attached to the housing and configured to cover the display, the cover including an opening formed through a body of the cover and exposing at least a part of the display via the opening when the cover is closed to cover the display;
   a sensor to detect whether the cover is opened or closed on the display; and
   a controller configured to:
   in response to detection of closing of the cover while executing a first application, control the display to change an execution screen of the first application to correspond to the exposed part of the display, wherein the opening comprises a first opening and a second opening smaller than the first opening in size, and wherein when closing of the cover is detected while executing the first application, the controller controls the display to display a first object of the execution screen of the first application in an area corresponding to the first opening and controls the display to display a second object of the execution screen of the first application in an area corresponding to the second opening.

2. The mobile terminal of claim 1, wherein changing the execution screen of the first application comprises at least one of resizing the execution screen of the first application to fit into the exposed part of the display, moving the execution screen of the first application into the exposed part of the display, and displaying a portion of the execution screen of the first application in the exposed part of the display.

3. The mobile terminal of claim 1, wherein when the cover is opened, the controller controls the display to display the execution screen of the first application at a position where the execution screen of the first application was located before closing the cover.

4. The mobile terminal of claim 1, wherein the first object comprises at least one of a still image, a video image, and a graphic image, and wherein the second object comprises at least one of a text data, a subtitle data, and a caption data.

5. The mobile terminal of claim 1, wherein the display comprises a touch screen, and wherein in response to detection of a predetermined touch input via the touch screen, the controller stores the execution screen of the first application, which is displayed in an area corresponding to the opening of the cover, as a captured image.

6. The mobile terminal of claim 5, wherein in response to detection of opening of the cover while executing the first application in a state that the cover is closed, the controller controls the display to display the stored captured image.

7. The mobile terminal of claim 1, wherein in response to detection of opening of the cover while executing the first application in a state that the cover is closed, the controller controls the display to display a lock screen or a home screen, and wherein in response to detection of re-opening of the cover after the opening and the closing of the cover are detected at least once within a predetermined time, the controller controls the display to display the execution screen of the first application.

8. The mobile terminal of claim 1, wherein in response to detection of re-opening of the cover after the opening and the closing of the cover within a predetermined time while executing the first application in a state that the cover is closed, the controller terminates execution of the first application.

9. The mobile terminal of claim 1, wherein in response to detection of a rotation of the mobile terminal around a rotation axis, the controller terminates execution of the first application.

10. The mobile terminal of claim 1, wherein the first application is to enter one of a camera mode, a memo mode, and a message mode according to a command input of a user or occurrence of an external event; and wherein the controller is configured to display the execution screen corresponding to the entered mode in a specific area of a screen of the display corresponding to the opening of the cover.

11. The mobile terminal of claim 10, wherein the controller is configured to:

in response to entering a multitasking mode, display a first image corresponding to the first application among a plurality of images in the specific area, wherein the plurality of images correspond to a plurality of applications, respectively, which are activated in the multitasking mode.

12. The mobile terminal of claim 11, wherein the controller is configured to:

in response to reception of a predetermined user input, display a second image corresponding to a second application among the plurality of images in the specific area instead of the first image.

13. The mobile terminal of claim 12, wherein the controller is configured to:

in response to detection of opening of the cover, display an execution screen of the second application corresponding to the second image in the display.

14. The mobile terminal of claim 10, wherein the controller is configured to:

in response to entering the camera mode, display a preview image obtained by a camera in the specific area.

15. The mobile terminal of claim 14, wherein the controller is configured to:

recognize a face of a person contained in the preview image; and change a display magnification of the preview image such that a size of the recognized face correspond to a size of the opening of the cover.

16. The mobile terminal of claim 15, wherein the controller is configured to:

detect a movement of the recognized face; and change the display magnification of the preview image such that a size of the moved face correspond to the size of the opening of the cover.

17. The mobile terminal of claim 14, wherein the controller is configured to:

recognize two or more faces contained in the preview image;

receive a first user input;

change the display magnification of the preview image such that a size of a first face among the recognized two or more faces correspond to a size of the opening of the cover;

receive a second user input; and change the display magnification of the preview image such that a size of a second face among the recognized two or more faces correspond to the size of the opening of the cover.

18. The mobile terminal of claim 14, wherein the controller is configured to:

display a part of the preview image obtained by the camera in the specific area, and display an indicator indicating a position of the part of the preview image within a whole of the preview image in the specific area.

19. The mobile terminal of claim 14, wherein the display includes a touch screen, and wherein the controller is configured to:

receive a touch input for touching the specific area; and change environment setting of the camera according to the received touch input.

20. A method of controlling a mobile terminal, comprising:

detecting whether a cover is opened or closed on a display of the mobile terminal, wherein the cover is attached to a housing and is configured to cover the display, and wherein the cover includes an opening formed through a body of the cover and exposes at least a part of the display via the opening when the cover is closed to cover the display, and the opening comprises a first opening and a second opening smaller than the first opening in size; and in response to detection of closing of the cover while executing a first application, controlling the display to change an execution screen of the first application to correspond to the exposed part of the display, wherein the controlling the display including:

controlling the display to display a first object of the execution screen of the first application in an area corresponding to the first opening, and controlling the display to display a second object of the execution screen of the first application in an area corresponding to the second opening.

* * * * *